(12) United States Patent
Torvi et al.

(10) Patent No.: US 11,133,958 B2
(45) Date of Patent: Sep. 28, 2021

(54) RESILIENT MULTIPROTOCOL LABEL SWITCHING (MPLS) RINGS USING SEGMENT ROUTING

(71) Applicant: Juniper Networks, Inc., Sunnyvale, CA (US)

(72) Inventors: Raveendra Torvi, Nashua, NH (US); Abhishek Deshmukh, Wilmington, MA (US); Kireeti Kompella, Los Altos, CA (US); Tarek Saad, Ottawa (CA); Vishnu Pavan Beeram, Naperville, IL (US); Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 120 days.

(21) Appl. No.: 16/588,434

(22) Filed: Sep. 30, 2019

(65) Prior Publication Data

US 2021/0014084 A1    Jan. 14, 2021

Related U.S. Application Data

(60) Provisional application No. 62/871,588, filed on Jul. 8, 2019.

(51) Int. Cl.
  *H04L 12/437* (2006.01)
  *H04L 12/24* (2006.01)
  *H04L 12/723* (2013.01)
(52) U.S. Cl.
  CPC .......... *H04L 12/437* (2013.01); *H04L 41/12* (2013.01); *H04L 45/50* (2013.01)
(58) Field of Classification Search
  None
  See application file for complete search history.

(56) References Cited

U.S. PATENT DOCUMENTS

| | | | | |
|---|---|---|---|---|
| 7,624,195 B1* | 11/2009 | Biswas | ............. | H04L 29/12283 370/389 |
| 2015/0326675 A1* | 11/2015 | Kini | ............. | H04L 43/10 709/224 |
| 2019/0273813 A1* | 9/2019 | Mirsky | ............. | H04L 47/125 |

FOREIGN PATENT DOCUMENTS

| | | | | |
|---|---|---|---|---|
| WO | WO 2017/045095 A1 | | 3/2017 | |
| WO | WO-2017045095 A1 * | | 3/2017 | ............. H04L 45/28 |

OTHER PUBLICATIONS

Kompella et al, "Resilient MPLS Rings: draft-ietf-mpls-rmr-11," Internet-Draft, (Internet Engineering Task Force (IETF), Jun. 8, 2019).

(Continued)

*Primary Examiner* — Ajit Patel
*Assistant Examiner* — Pamit Kaur
(74) *Attorney, Agent, or Firm* — John C. Pokotylo; Pokotylo Patent Services

(57) ABSTRACT

A ring node N belonging to a resilient MPLS ring (RMR) provisions and/or configures clockwise (CW) and anti-clockwise (AC) paths on the RMR by: (a) configuring two ring node segment identifiers (Ring-SIDs) on the ring node, wherein a first of the two Ring-SIDs (CW-Ring-SID) is to reach N in a clockwise direction on the ring and a second of the two Ring-SIDs (AC-Ring-SID) is to reach N in an anti-clockwise direction on the ring, and wherein the CW-Ring-SID and AC-Ring-SID are unique within a source packet routing in networking (SPRING) domain including the ring; (b) generating a message including the ring node's CW-Ring-SID and AC-Ring-SID; and (c) advertising the message, via an interior gateway protocol, for receipt by other ring nodes belonging to the ring such that (1) a clockwise multipoint-to-point path (CWP) is defined such that every other one of the ring nodes belonging to the ring can be an ingress for the CWP and such that only the node (Continued)

is an egress for the CWP, and (2) an anti-clockwise multipoint-to-point path (ACP) is defined such that every other one of the ring nodes belonging to the ring can be an ingress for the ACP and such that only the node is an egress for the ACP.

20 Claims, 23 Drawing Sheets

(56) References Cited

OTHER PUBLICATIONS

Kompella et al, "Resilient MPLS Rings: draft-kompella-spring-rmr-00," Internet-Draft, (Internet Engineering Task Force (IETF), Oct. 22, 2018).
Kompella et al, "Resilient MPLS Rings using Segment Routing," draft-kompella-spring-rmr-01, Internet-Draft, (Internet Engineering Task Force (IETF), Jul. 7, 2019).
Kompella et al, "Using DHCP to Manage Node and Ring SID Assignment," draft-kompella-spring-dhcp-00, Internet-Draft, (Internet Engineering Task Force (IETF), Jul. 7, 2019).
Extended European Search Report to corresponding European Patent Application No. 19218432.3-1215, dated May 15, 2020 (13 pgs.).

* cited by examiner

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| TYPE 1310 | | | | | | | | | | | | | | | | LENGTH 1320 | | | | | | | | | | | | | | | |
| RING ID (RID) (continued) 1330' | | | | | | | | | | | | | | | | RING ID (RID) 1330 | | | | | | | | | | | | | | | |
| NODE FLAGS 1340 | | | | | | | | | | | | | | | | | | | | | | | | | | | | | | | |
| SUB TLV(s) (if any) 1350 | | | | | | | | | | | | | | | | | | | | | | | | | | | | | | | |

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   TYPE  1410  |  LENGTH  1420 |     FLAGS  1430      | ALGORITHM 1440 |
+-+-+-+-+-+-+-+-+-+-+-+-+-+-+-+-+-+-+-+-+-+-+-+-+-+-+-+-+-+-+-+-+
|                        RING ID (RID)  1450                     |
+-+-+-+-+-+-+-+-+-+-+-+-+-+-+-+-+-+-+-+-+-+-+-+-+-+-+-+-+-+-+-+-+
|                 SID (e.g., INDEX/LABEL) (variable)  1460       |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   TYPE  1410  |  LENGTH  1420 |       CW RING SID...  1470a    |
+-+-+-+-+-+-+-+-+-+-+-+-+-+-+-+-+-+-+-+-+-+-+-+-+-+-+-+-+-+-+-+-+
|  ...CW RING SID...  1470b     |       AC RING SID...  1480a    |
+-+-+-+-+-+-+-+-+-+-+-+-+-+-+-+-+-+-+-+-+-+-+-+-+-+-+-+-+-+-+-+-+
|  ...AC RING SID  1480b        |
+-+-+-+-+-+-+-+-+-+-+-+-+-+-+-+-+
```

RESILIENT MULTIPROTOCOL LABEL SWITCHING (MPLS) RINGS USING SEGMENT ROUTING

§ 0. RELATED APPLICATIONS

This application claims the benefit of U.S. Provisional Application No. 62/871,588 (referred to as "the '588 provisional" and incorporated herein by reference), titled "RESILIENT MULTIPROTOCOL LABEL SWITCHING (MPLS) RINGS USING SEGMENT ROUTING," filed on Jul. 8, 2019 and listing Raveendra Torvi, Abhishek Deshmukh, Kireeti Kompella, Tarek Saad, Vishnu Pavan Beeram and Ronald Bonica as the inventors. The scope of the invention is not limited to any requirements of the specific embodiments in the '588 provisional.

§ 1. BACKGROUND

§ 1.1 Technical Field

The present disclosure concerns communications networks, and in particular configuring a resilient ring within a communications network.

§ 1.2 Background Information

Although multiprotocol label switching (MPLS), resilient MPLS Rings (RMRs) and Segment Routing (SR) are understood by those in the art, each is introduced here for the reader's convenience.

§ 1.2.1 Multiprotocol Label

Multiprotocol Label Switching (MPLS) is a method for engineering traffic patterns by assigning short labels to network packets that describe how to forward them through the network. MPLS is independent of routing tables or any routing protocol and can be used for unicast packets. More specifically, in a traditional Internet protocol (IP) network, packets are transmitted with an IP header that includes a source and destination address. When a router receives such a packet, it examines its forwarding tables for the next-hop address associated with the packet's destination address and forwards the packet to the next-hop location. On the other hand, in an MPLS network, each packet is encapsulated with an MPLS header. When a router receives the packet, it copies the header as an index into a separate MPLS forwarding table. Each entry in the MPLS forwarding table includes forwarding information that the router uses to forward the traffic and modify, when necessary, the MPLS header. Since the MPLS forwarding table has far fewer entries than the more general forwarding table, the lookup consumes less processing time and processing power. The resultant savings in time and processing are a significant benefit for traffic that uses the network to transit between outside destinations only.

Label-switched paths (LSPs) are unidirectional routes through a network or autonomous system (AS). In normal IP routing, the packet has no predetermined path. Instead, each router forwards a packet to the next-hop address stored in its forwarding table, based only on the packet's destination address. Each subsequent router then forwards the packet using its own forwarding table. In contrast, MPLS routers (within an AS) determine paths through a network through the exchange of MPLS traffic engineering information. Using these paths, the routers direct traffic through the network along an established route. Rather than selecting the next hop along the path as in IP routing, each router is responsible for forwarding the packet to a predetermined next-hop address.

Routers that are part of the LSP are referred to label-switching routers (LSRs). Each LSR must be configured with MPLS so that it can interpret MPLS headers and perform the MPLS operations required to pass traffic through the network. An LSP can include four types of LSRs. First, an ingress or inbound LSR provides the entry point for traffic into MPLS. Native IPv4 packets are encapsulated into the MPLS protocol by the ingress router. Each LSP can have only one ingress router. Second, a transit LSR is any router in the middle of an LSP. Transit LSRs forward MPLS traffic along the LSP, using only the MPLS header to determine how the packet is routed. Third, the penultimate LSR is the second-to-last router in the LSP. If penultimate hop popping (PHP) is employed, the penultimate LSR is responsible for stripping the MPLS header from the packet before forwarding it to the outbound router. Fourth, the egress or outbound LSR is the endpoint for the LSP. The egress router receives MPLS packets from the penultimate LSR and performs an IP route lookup. The egress router then forwards the packet to the next hop of the route. Each LSP can have only one outbound router.

To forward traffic through an MPLS network, MPLS routers encapsulate packets and assign and manage headers known as labels. A label is a 20-bit unsigned integer in the range 0 through 1,048,574. The routers use the labels to index the MPLS forwarding tables that determine how packets are routed through the network. When a network's inbound router receives traffic, it inserts an MPLS label between the IP packet and the appropriate Layer 2 header for the physical link. The label contains an index value that identifies a next-hop address for the particular LSP. When the next-hop transit router receives the packet, it uses the index in the MPLS label to determine the next-hop address for the packet and forwards the packet to the next router in the LSP. As each packet travels through the transit network, every router along the way performs a lookup on the MPLS label and forwards the packet accordingly. When the egress router receives a packet, it examines the header to determine that it is the final router in the LSP. The egress router then removes the MPLS header, performs a regular IP route lookup, and forwards the packet with its IP header to the next-hop address.

LSRs can perform five label operations, First, a "push" operation adds a new label to the top of the packet. For IPv4 packets arriving at the inbound router, the new label is the first label in the label stack. For MPLS packets with an existing label, this operation adds a label to the stack and sets the stacking bit to 0, indicating that more MPLS labels follow the first. When the ingress router receives the packet, it performs an IP route lookup on the packet. Because the route lookup yields an LSP next hop, the ingress router performs a label push on the packet, and then forwards the packet to the LSP next hop. Second, a "swap" (or switch) operation replaces the label at the top of the label stack with a new label. When a transit router receives the packet, it performs an MPLS forwarding table lookup. The lookup yields the LSP next hop and the path index of the link between the transit router and the next router in the LSP. Third, a "pop" operation removes the label from the top of the label stack. For IPv4 packets arriving at the penultimate router, the entire MPLS label is removed from the label stack. For MPLS packets with an existing label, this operation removes the top label from the label stack and modifies the stacking bit as necessary (e.g., sets it to 1 if only a single label remains in the stack). If multiple LSPs terminate at the same outbound router, the router performs MPLS label operations for all outbound traffic on the LSPs. To share the operations among multiple routers, most LSPs use penultimate hop popping (PHP). Fourth, a "multiple push" operation adds multiple labels to the top of the label stack. This action is equivalent to performing multiple push operations. Finally, a "swap and push" operation replaces the top label with a new label and then pushes a new label to the top of the stack.

An MPLS LSP may be established either (A) statically (e.g., via manual configuration), or (B) dynamically (e.g., using a protocol such as the label distribution protocol (LDP) or the resource reservation protocol (RSVP)). Like a static route, a static LSP requires each router along the path to be configured explicitly. A network administrator must manually configure the path and its associated label values. Static LSPs require less processing by the LSRs because no signaling protocol is used. However, because paths are statically configured, they cannot adapt to network conditions. Dynamic LSPs use signaling protocols to establish themselves and propagate LSP information to other LSRs in the network. A network administrator configures the inbound router with LSP information that is transmitted throughout the network when they enable the signaling protocols across the LSRs. Because the LSRs must exchange and process signaling packets and instructions, dynamic LSPs consume more resources than static LSPs. However, dynamic LSPs can avoid the network problems by detecting topology changes and outages and propagating them throughout the network.

FIG. 1 illustrates an example of an LSP between ingress router R1 (PE1) and egress router R5 (PE2). Typically, when MPLS is deployed, penultimate hop popping ("PHP") is used instead of ultimate hop popping ("UHP"). Router CE1 forwards an Internet Protocol (IP) packet to its next hop (R1), which is also the LSP ingress (or headend). R1 checks prefix 5.5.5.5 (destination loopback) against the following information stored in its forwarding table:

```
enugadi@Enugadi# run show route 5.5.5.5
inet.0: 16 destinations, 17 routes (15 active, 0 holddown, 1 hidden)
+ = Active Route, - = Last Active, * = Both
5.5.5.5/32      *[Static/5] 01:33:28
                > to 10.0.0.2 via ge-0/0/0.10, Push 1000002
                [OSPF/10] 01:01:42, metric 5
                > to 10.0.0.2 via ge-0/0/0.10
```

R1 pushes label L1 (L1-1000002) on the packet and forwards the labeled packet (L1+IP) to router R2. R2 checks input label 1000002 against the following information stored in its MPLS forwarding table:

```
enugadi@Enugadi# run show route table mpls.0
label 1000002 logical-router r2
mpls.0: 6 destinations, 6 routes (6 active, 0 holddown, 0 hidden)
+ = Active Route, - = Last Active, * = Both
1000002         *[Static/5] 00:45:22
                > to 10.0.0.6 via ge-0/1/0.10, Swap 1000003
```

As a result, R2 completes the standard MPLS label swapping operation, swapping label L1 for label L2 (L2-10000003), and forwards the labeled packet (L2+IP) to router R3. R3 checks the input label 10000003 against the following information stored in its MPLS forwarding table:

```
enugadi@Enugadi# run show route table mpls.0
label 1000003 logical-router r3
mpls.0: 5 destinations, 5 routes (5 active, 0 holddown, 0 hidden)
+ = Active Route, - = Last Active, * = Both
1000003         *[Static/5] 00:50:03
                > to10.0.0.10 via ge-0/0/0.11, Swap 1000004
```

As a result, R3 completes the standard MPLS label swapping operation, swapping label L2 for label L3 (L3-10000004), and forwards the labeled packet (L3+IP) to router R4. R4 checks the input label 10000004 against the following information stored in its MPLS forwarding table:

```
enugadi@Enugadi# run show route table mpls.0
label 1000004 logical-router r4
mpls.0: 6 destinations, 6 routes (6 active, 0 holddown, 0 hidden)
+ = Active Route, - = Last Active, * = Both
1000004         *[Static/5] 01:24:54
                > to 10.0.0.14 via ge-0/0/0.11, Swap 0
1000004(S=0)    *[Static/5] 01:24:54
                > to 10.0.0.14 via ge-0/0/0.11, Pop
```

Since R4 is the penultimate-hop router for the LSP to router R5 (PE2), it first pops the label L3 and then forwards the packet (e.g., with label 0, not shown) to router R5. When R5 receives the packet, it can have a service label, an explicit-null label, or just be a plain IP or VPLS packet. R5 then forwards the unlabeled packet to router CE2.

In summary, with the static LSP, R1 reaches R5 through MPLS labeling which is indicated by traceroute result below:

```
enugadi@Enugadi# run traceroute 5.5.5.5
traceroute to 5.5.5.5 (5.5.5.5), 30 hops max, 40 byte packets
  1 10.0.0.2 (10.0.0.2) 0.172 ms 0.118 ms 0.109 ms
      MPLS Label=1000002 CoS=0 TTL=1 S=1
  2 10.0.0.6 (10.0.0.6) 0.204 ms 0.194 ms 0.192 ms
      MPLS Label=1000003 CoS=0 TTL=1 S=1
  3 10.0.0.10 (10.0.0.10) 0.288 ms 0.283 ms 0.280 ms
      MPLS Label=1000004 CoS=0 TTL=1 S=1
  4 5.5.5.5 (5.5.5.5) 0.336 ms 0.332 ms 0.336 ms
```

§ 1.2.2 Resilient MPLS Rings (RMRs)

Rings are a very common topology in transport networks. A ring is the simplest topology offering link and node resilience. Rings are nearly ubiquitous in access and aggregation networks. As MPLS increases its presence in such networks, and takes on a greater role in transport, it is imperative that MPLS handles rings well.

The document, Kompella, et al., "Resilient MPLS Rings," draft-ietf-mpls-rmr-11 (Internet Engineering Task Force, Jun. 8, 2019)(referred to as the "mpls-rmr draft" and incorporated herein by reference) describes the use of MPLS control and data planes on ring topologies, and in particular, describes how MPLS rings may be configured, auto-discovered and signaled, as well as how the data plane works. Section 3 of the mpls-rmr draft and its subsections discuss the theory of operation of an MPLS ring.

Further, FIGS. 1-22 of the '588 provisional illustrate and describe various aspects of RMRs. Advantageously, LSPs need not be configured manually on RMRs; only ring IDs need be configured. Rather, LSPs are self-provisioned. Bandwidths needed can be deduced from traffic or services. Further, protection paths, bypass LSPs, detours, etc., need not be configured since protection paths occur naturally, with no micro-loops.

Section 4 of the mpls-rmr draft and its subsections describe auto-discovery of an MPLS ring, including a ring announcement phase, a mastership phase, and a ring identified phase. After completion of these phases, the ring is said to be "oriented." Referring to FIG. 2 of the present application, nodes 0-9 are arranged in a ring. Although not shown, each node is configured with a ring identifier (ID). The ring ID is used to uniquely identify a ring within an autonomous system (AS). Interfaces between ring neighbors may be automatically bundled. An interior gateway protocol (IGP) may be used to discover ring neighbors, ring interfaces and bypass links. In FIG. 2, ring links are depicted as solid lines, non-ring links are depicted with dotted lines and each is denoted NRL, and bypass links are depicted as dot-dashed lines and each is denoted BL. An RMR may be auto-discovered as follows. As noted above, each of the nodes of the ring is assigned a ring ID (e.g., 17). A so-called "ring master" is elected. In FIG. 2, assume that node 0 is the ring master. All other ring nodes learn their ring ID from their neighbors and advertise their membership in the particular ring ID. Node 0, acting as the ring master, determines its clockwise (CW) and anti-clockwise (AC) neighbors, and its ring links. Then node 0 identifies its bypass links. This process continues (e.g., CW to node 1, then node 2, and so on, until node 9, and/or AC to node 9, then node 8, and so on, until node 1). Finally, non-rings are identified. At this point, the ring is said to be "oriented", and signaling to establish LSPs occurs.

Section 5 of the mpls-rmr draft notes that procedures for signaling LSPs (e.g., clockwise (CW) and anticlockwise (AC) sub-LSPs) within the ring. (Please note that the term "label switched path" and the acronym "LSP" are commonly used in conjunction with Segment Routing (SR) and/or segment routing in networking (SPRING) even though labels may be used from the top of a label stack and popped (rather than switched), and even though, as in some example embodiments consistent with the invention, that the same label may be used as a packet is forwarded over multiple segments, until the egress of the path. Therefore, the term "path" may be used instead of label switched path (or LSP), and the acronym LSP is to be interpreted broadly so as not to require switching or swapping of labels.)

FIG. 3 illustrates CW and AC sub-LSPs for node 0. Any node can serve as an ingress for either CW sub-LSP or AC sub-LSP, but the node 0 serves as the egress for each sub-LSP shown. Note that each of the nodes 0-9 may have its own CW sub-LSP and AC sub-LSP. These sub-LSPs can serve to redirect traffic in the event of a link failure within the ring.

More specifically, these sub-LSPs may provide failure protection using local repairs and/or global repairs. FIG. 4 illustrates a local repair using a CW sub-LSP and an AC sub-LSP for node 0. Suppose that the link between nodes 3 and 4 fails, as denoted with an X. At node 3, the CW sub-LSP will switch over to the AC sub-LSP as shown by 310. At node 4, the AC sub-LSP will switch over to the CW sub-LSP as shown by 320. Further, referring to FIG. 5, without needing to re-signal the CW sub-LSP and AC sub-LSP for node 0, error propagation on each of the CW and AC sub-LSPs may be used to cascade the traffic switchover to the other sub-LSP as follows. The CW sub-LSP will switchover to the AC sub-LSP at node 3, and then node 2, and then node 1. The AC sub-LSP will switchover to the CW sub-LSP at node 4, and then node 5, and then node 6, and then node 7, and then node 8, and then node 9.

§ 1.2.3 Segment Routing

The Internet was initially designed to provide best-effort connectivity over a least-cost path. In today's Internet, however, many applications require more than best-effort connectivity over a least-cost path. Today, network operators are tasked with delivering advance services such as traffic engineering and fast reroute at scale. To deliver these advanced services at scale, network operators must reduce network complexity. Segment Routing (SR) offers an innovative approach to traffic steering. It can be applied to long-standing problems such as traffic engineering and fast reroute. When applied to these problems, SR can simplify routing protocols, network design and network operations.

Segment routing (also referred to as Source Packet Routing in Networking ("SPRING")) is a control-plane architecture that enables an ingress router to steer a packet through a specific set of nodes and links in the network without relying on the intermediate nodes in the network to determine the actual path it should take. In this context, the term "source" means the point at which the explicit route is imposed. Segment routing is defined in the document, Filsfils, Ed. and S. Previdi, Ed., "Segment Routing Architecture," Request for Comments 8402 (July 2018, the Internet Engineering Task Force) (referred to as "RFC 8402" and incorporated herein by reference). SPRING enables automation of a network by using a software-defined network ("SDN") controller for traffic steering and traffic engineering in a wide area network ("WAN") packet network.

Segment routing leverages the source routing paradigm. A node steers a packet through an ordered list of instructions, called "segments." For example, an ingress router (also referred to as "a headend router") can steer a packet through a desired set of nodes and links by prepending the packet with segments that contain an appropriate combination of tunnels.

§ 1.2.3.1 SR Domain

An SR domain is a collection of nodes that participate in SR protocols. Within an SR domain, a node can execute ingress, transit, or egress procedures. FIG. 6 depicts a network in which a source node sends a packet to a destination node. The source and destination nodes reside outside of the SR domain, but the path between them traverses the SR domain. More specifically, when the packet arrives at the SR ingress node (R1), the ingress node subjects the packet to policy. Policy can associate a packet with an SR path. Policy includes match conditions and actions. If the packet satisfies match conditions, the SR ingress node (R1) can encapsulate the packet in an SR tunnel. The SR tunnel traverses an SR path to the egress node (R6).

The SR path can be engineered to satisfy any number of constraints (e.g., minimum link bandwidth, maximum path latency). While an SR path can follow the least cost path to the egress node, constraints can cause it to follow another path.

The source node and the SR ingress node may reside on independent hardware platforms (e.g., on a laptop and a router, respectively), or the source node and SR ingress node can reside on the same hardware (e.g., on a virtual machine and a hypervisor, respectively). Similarly, the SR egress node and the destination node can reside on independent hardware platforms, or on a single platform. In a less typical configuration, the source node resides within the SR domain. In this case, the source node is also the SR ingress node, because it executes SR ingress procedures Similarly, the destination node can reside within the SR domain, in which case, the destination node is also the SR egress node, because it executes SR egress procedures.

§ 1.2.3.2 SR Path

An SR path is an ordered list of segments that connects an SR ingress node to an SR egress node. Although an SR path can follow the least cost path from ingress to egress, it can also follow another path.

Different SR paths can share the same segment. For example, referring to FIG. 7, Path A connects ingress node A to egress node Z, while Path B connects ingress node B to the same egress node Z. Both paths A and B traverse Segment 3.

When an SR ingress node encapsulates a packet in an SR tunnel, it encodes the associated segment list in the tunnel header. It then forwards the packet downstream. Transit nodes process the tunnel header, forwarding the packet from the current segment to the next segment. Since the SR ingress node encodes path information in the tunnel header, transit nodes do not need to maintain information regarding each path that they support. Rather, the transit nodes are only required to process the tunnel header, forwarding the packet from the current segment to the next segment. This is a major benefit of SR. More specifically, since transit nodes are not required to maintain path information, overhead associated with maintaining that information is eliminated, routing protocols are simplified, scaling characteristics are improved, and network operations become less problematic.

§ 1.2.3.3 SR Segment

An SR segment is an instruction that causes a packet to traverse a section of the network topology. While a segment (i.e., an instruction) causes a packet to traverse a section of the network topology, it is distinct from that section of the network topology. SR defines many different SR segment types. Among these are the "adjacency segments" and "prefix segments." Each of these types of segments is described below.

§ 1.2.3.3.1 Adjacency Segments

An adjacency segment is an instruction that causes a packet to traverse a specified link (i.e., a link that is associated with an IGP adjacency). FIG. 8 depicts an SR path that connects ingress node R1 to egress node R6. The path contains the following adjacency segments: (1) segment 1, instantiated on R1, causes packets to traverse link R1→R2; (2) segment 2, instantiated on R2, causes packets to traverse link R2→R3; and segment 3, instantiated on R3, causes packets to traverse link R3→R6. If any of the above-mentioned links becomes unavailable, so does the associated adjacency segment. Consequently, if any of the above-mentioned adjacency segments becomes unavailable, so does the entire path.

Thus, an adjacency segment is a strict forwarded single-hop tunnel that carries packets over a specific link between two nodes, irrespective of the link cost.

§ 1.2.3.3.2 Prefix Segments

A prefix segment is an instruction that causes a packet to traverse the least cost path (or a path determined using an identified algorithm) to a node or prefix. Referring to FIG. 9A, assume that all links are configured with the same interior gateway protocol (IGP) metric and that the SR path is to be a least cost (and therefore) shortest path. An SR path connects ingress node R1 to egress node R6 and contains the following prefix segments: (1) segment 1, instantiated on R1, causes packets to traverse the least cost path from R1 to R2; (2) segment 2, instantiated on R2 and R3, causes packets to traverse the least cost path from the instantiating node to R6. Consequently, when the links are all available, the SR path guides packets through the above-mentioned links and segments.

Referring to FIG. 9B, assume that the link R1→R2 becomes unavailable. When this occurs, the network establishes a new least cost path between R1 and R2. This new least cost path includes Links R1→R4, and R4→R2. Since the network has established a new least cost path between R1 and R2, segment 1 remains available and causes packets to traverse the new least cost path. The behavior of segment 2 is unchanged. Therefore, the path now traverses Links R1→R4, R4→R2, R2→R3 and R3→R6.

Thus, a prefix segment is a multihop tunnel that uses equal cost multi-hop aware shortest path links to reach a prefix. A prefix segment identifier (SID) supports both IPv4 and IPv6 prefixes. A node segment is a special case of prefix segment that uses shortest path links between two specific nodes.

§ 1.2.3.3.3 Anycast Segments

An IGP anycast segment is an IGP prefix segment that identifies a set of routers. An anycast segment enforces forwarding based on the equal-cost multipath-aware (ECMP-aware) shortest-path toward the closest node of the anycast set. Within an anycast group, all the routers advertise the same prefix with the same segment identifier (SID) value, which facilitates load balancing. Thus, an anycast segment is also a type of prefix segment that identifies a set of routers to advertise the same prefix with the same SID value.

§ 1.2.3.4 SR Multi-Protocol Label Switching (MPLS)

In SR-MPLS, SR paths are encoded as MPLS label stacks, with each label stack entry representing a segment in the SR path. The following describes how MPLS labels are used to encode adjacency and prefix segments.

§ 1.2.3.4.1 Using MPLS Labels to Encode Adjacency Segments

Referring to FIG. 10, an SR path connects R1 to R4. The SR path contains three adjacency segments. Segment 1 causes packets to traverse link R1→R2, segment 2 causes packets to traverse link R2→R3, and segment 3 causes packets to traverse link R3→R4. When R1 receives a packet from outside of the SR domain, it subjects the packet to policy. Policy may cause R1 to forward the packet through the SR path shown in FIG. 10. When this occurs, R1 imposes an MPLS label stack containing two entries. The entry at the top of the stack represents segment 2 and carries MPLS label 1002. The entry at the bottom of the stack represents segment 3 and carries MPLS label 1003.

Having imposed an MPLS label stack, R1 forwards the encapsulated packet through segment 1 (i.e., Link R1→R2). When the packet arrives at R2, R2 extracts the top label (i.e., 1002) from the label stack and searches for a corresponding entry in its Forwarding Information Base ("FIB"). The corresponding FIB entry includes an instruction (i.e., POP) and a next-hop (i.e., R3). Therefore, R2 pops the topmost label from the label stack and forwards the packet through segment 2 (i.e., Link R2→R3).

When the packet arrives at R3, R3 extracts the label (i.e., 1003) from the remaining label stack and searches for a corresponding entry in its FIB. The corresponding FIB entry includes an instruction (i.e., POP) and a next-hop (i.e., R4). Therefore, R3 pops the remaining entry from the label stack and forwards the packet through segment 3 (i.e., Link R3→R4). As shown in FIG. 10, after traversing the SR path, the packet arrives at R4 without MPLS encapsulation.

§ 1.2.3.4.2 Using MPLS Labels to Enclode Prefix Segments

In FIG. 11, an SR path connects R1 to R7 via R4. The SR path contains two prefix segments. Segment 1 is a prefix segment that causes packets to traverse the (e.g., least cost) path from R1 to R4. Segment 2 is a prefix segment that causes packets to traverse the (e.g., least cost) path from R4 to R7. In this network, assume that all links are configured with the same IGP metric (e.g., 10). Therefore, the least cost path for the first segment from R1 to R4 traverses links R1→R2, R2→R3 and R3→R4, while the least cost path for the second segment from R4 to R7 traverses links R4→R8 and R8→R7.

When R1 receives a packet from outside of the SR domain, it subjects the packet to policy. Policy may cause R1 to forward the packet through the SR path shown in FIG. 11. When this occurs, R1 imposes an MPLS label stack containing two entries. The top entry of the label stack represents segment 1 and carries the label 2001. The bottom entry of the label stack represents segment 2 and carries the label 2002. Having imposed an MPLS label stack, R1 forwards the encapsulated packet into segment 1 via link R1→R2.

When the packet arrives at R2, R2 extracts the top label (i.e., 2001) from the label stack and searches for a corresponding entry in its FIB. The corresponding FIB entry includes an instruction (i.e., SWAP—3001) and a next-hop (i.e., R3). Therefore, R2 overwrites the topmost label with a new value (i.e., 3001) and forwards the packet to R3.

When the packet arrives at R3, R3 extracts the top label (i.e., 3001) from the label stack and searches for a corresponding entry in its FIB. The corresponding FIB entry includes an instruction (i.e., POP) and a next-hop (i.e., R4). Therefore, R3 pops the topmost entry from the label stack and forwards the packet into segment 2 via link R3→R4.

When the packet arrives at R4, R4 extracts the remaining label (i.e., 2002) from the label stack and searches for a corresponding entry in its FIB. The corresponding FIB entry includes an instruction (i.e., SWAP—3002) and a next-hop (i.e., R8). Therefore, R4 overwrites the remaining label with a new value (i.e., 3002) and forwards the packet to R8.

When the packet arrives at R8, R8 extracts the remaining label (i.e., 3002) from the label stack and searches for a corresponding entry in its FIB. The corresponding FIB entry includes an instruction (i.e., POP) and a next-hop (i.e., R7). Therefore, R8 pops the remaining entry from the label stack and forwards the packet to R7 without MPLS encapsulation.

§ 1.2.3.4.3 Penultimate Hop Popping (PHP) and the Explicit Null Label

In the examples above, each segment executes PHP procedures. That is, when a packet traverses a segment, the segment's penultimate node pops the label associated with the segment. If the SR path contains another segment, yet to be traversed, the current segment's egress node is also the ingress node of the next segment. In this case, the packet arrives at that node with the next segment's label exposed on the top of the stack. If the SR path does not contain another segment, yet to be traversed, the segment egress node is also the path egress node. In that case, the packet arrives at the path egress node without MPLS encapsulation.

In some cases, the final link in the SR path may not be able to carry the packet without MPLS encapsulation. For example, the packet may be IPv6, while the link supports IPv4 only. In order to prevent this problem, the SR ingress node can add an MPLS Explicit Null label to the top of the MPLS label stack.

When the penultimate node in the final segment pops the label associated with the final segment, it exposes the Explicit Null label. It then forwards the packet to the path egress node. The path egress node pops the Explicit Null label and continues to process the packet.

§ 1.2.3.5 Configuration and Distribution of Segment Identifiers (SIDs)

The foregoing examples described with respect to FIGS. 10 and 11 assumed that MPLS labels were distributed and each node's FIB was populated. Essentially segment routing engages interior gateway protocols ("IGPs") like Intermediate-System Intermediate-System ("IS-IS") and open shortest path first ("OSPF") for advertising two types of network segments or tunnels—(1) a strict forwarded single-hop tunnel that carries packets over a specific link between two nodes, irrespective of the link cost (referred to as "adjacency segments," which were described in § 1.2.3.3.1 above), and (2) a multihop tunnel using shortest path links between two specific nodes (referred to as "node segments," which were described in § 1.2.3.3.2 above).

Each segment is associated with an identifier, which is referred to as the segment identifier ("SID"). As already noted above, an ordered list of segments is encoded as a stack of labels. A segment can represent any instruction, topological or service-based. A segment can have a local semantic to a segment routing node or to a global node within a segment routing domain. Segment routing enforces a flow through any topological path and service chain while maintaining per-flow state only at the ingress node to the segment routing domain. Segment routing can be directly applied to the MPLS architecture with no change on the forwarding plane. A segment is encoded as an MPLS label. An ordered list of segments is encoded as a "stack" of labels or "label stack." The segment to be processed is on the top of the stack (i.e., the outermost label of the label stack). Upon completion of a segment, the related label is "popped" (i.e., removed) from the stack.

Segment routing can be applied to the IPv6 architecture, with a new type of routing extension header. A segment is encoded as an IPv6 address. An ordered list of segments is encoded as an ordered list of IPv6 addresses in the routing extension header. The segment to process is indicated by a pointer in the routing extension header. Upon completion of a segment, the pointer is incremented.

§ 1.2.3.5.1 Configurable Segment Routing Global Block

As already noted above, segment is encoded as an MPLS label. An ordered list of segments is encoded as a stack of labels. Every node in the segment routing domain is allocated labels by the node label manager based on the index range configured for source packet routing. These labels are allocated to the node segment based on the availability of the dynamic label range managed by node label manager. A segment routing global block ("SRGB") is the range of label values used in segment routing. An available SRGB label range can be configured for the IS-IS and OSPF protocols so that the labels are predictable across segment routing domains. Thus, every node in the segment routing domain is allocated labels based on the availability of the dynamic label range, and the SRGB is the range of label values reserved for segment routing. A SID may be provided as an index to be added to an SRGB base value to obtain a label value.

The IS-IS protocol creates adjacency segments per adjacency, level, and address family (one each for IPv4 and IPv6). An MPLS label is allocated for each adjacency segment that gets created. These labels are allocated after the adjacency status of the segment changes to the up state. The OSPF protocol creates adjacency segments per adjacency.

§ 1.2.4 RSVP LSP Rings

U.S. patent application Ser. No. 16/117,059, filed on Aug. 30, 2018, and titled "BANDWIDTH MANAGEMENT FOR RESORCE RESERVATION LABEL SWITCHED PATH OF A RING NETWORK" (referred to as "the '059 application" and incorporated herein by reference) describes example way(s) to configure (e.g., signal) LSPs to define a resilient MPLS ring. However, there may be situations in which different techniques for configuring (e.g., signaling) LSPs to define a resilient MPLS ring would be useful.

§ 2. SUMMARY

It would be useful to provide resilient MPLS rings (RMRs) using segment routing (SR). It would be useful to provide signaling to facilitate the configuration of such SR RMRs.

A ring node N belonging to a resilient MPLS ring (RMR) provisions and/or configures clockwise (CW) and anti-clockwise (AC) paths on the RMR, in a manner consistent with the present description, by: (a) configuring two ring node segment identifiers (Ring-SIDs) on the ring node, wherein a first of the two Ring-SIDs (CW-Ring-SID) is to reach N in a clockwise direction on the ring and a second of the two Ring-SIDs (AC-Ring-SID) is to reach N in an anti-clockwise direction on the ring, and wherein the CW-Ring-SID and AC-Ring-SID are unique within a source packet routing in networking (SPRING) domain including the ring; (b) generating a message including the ring node's CW-Ring-SID and AC-Ring-SID; and (c) advertising the message, via an interior gateway protocol, for receipt by other ring nodes belonging to the ring such that (1) a clockwise multipoint-to-point path (CWP) is defined such that every other one of the ring nodes belonging to the ring can be an ingress for the CWP and such that only the node is an egress for the CWP, and (2) an anti-clockwise multi-point-to-point path (ACP) is defined such that every other one of the ring nodes belonging to the ring can be an ingress for the ACP and such that only the node is an egress for the ACP.

In at least some example embodiments consistent with the present description, the node further: (d) receives a message including another one of the ring node's CW-Ring-SID and AC-Ring-SID; (e) generates and stores a first label forwarding information base (LFIB) entry including (1) a node segment identifier (Node-SID) associated with the other one of the ring nodes, or a multiprotocol label switching (MPLS) label derived from the Node-SID, and (2) a next hop set to a ring node belonging to the ring and being adjacent and clockwise to the ring node; and (f) generates and stores, a second LFIB entry including (1) the Node-SID associated with the other one of the ring nodes, or a multiprotocol label switching (MPLS) label derived from the Node-SID, and (2) a next hop set to a ring node belonging to the ring and being adjacent and anti-clockwise to the ring node. One of the first and second LFIB entries is identified as a primary path, and the other of the first and second LFIB entries is identified as a backup path. In at least some such embodiments, the MPLS label is derived from the Node-SID using a minimum or maximum value from a segment routing global block (SRGB) defining a range of label values.

In at least some example embodiments consistent with the present description, the act of configuring the CW-Ring-SID and the AC-Ring-SID is performed by a segment routing mapping server (SRMS) using a reserved block of Ring-SID indices.

In at least some example embodiments consistent with the present description, the act of configuring the CW-Ring-SID and the AC-Ring-SID is performed by a Dynamic Host Configuration Protocol (DHCP) server.

In at least some example embodiments consistent with the present description, the act of configuring the CW-Ring-SID and the AC-Ring-SID is performed by a Path Computation Element Communication Protocol (PCEP) server.

In at least some example embodiments consistent with the present description, the message including the ring node's CW-Ring-SID and AC-Ring-SID further includes information for identifying an algorithm used to derive a next hop to reach the ring node. In at least some such embodiments, the algorithm used to derive a next hop to reach the ring node specifies the use of a specified one of a CW next hop and an AC next hop.

In at least some example embodiments consistent with the present description, the message is advertised by flooding it over an interior gateway protocol (IGP) domain.

In at least some example embodiments consistent with the present description, the message is advertised within an explicit prefix type-length-value (TLV) interior gateway protocol (IGP) advertisement.

In at least some example embodiments consistent with the present description, the message is advertised within a SID/label binding type-length-value (TLV) interior gateway protocol (IGP) advertisement.

In at least some example embodiments consistent with the present description, each of the ring node's CW-Ring-SID and AC-Ring-SID included in the message is expressed as a label value.

In at least some example embodiments consistent with the present description, each of the ring node's CW-Ring-SID and AC-Ring-SID included in the message is expressed as an index defining an offset from one of a start or end of a predefined segment routing global block (SRGB) of labels.

In at least some example embodiments consistent with the present description, the act of advertising the message, via an interior gateway protocol, for receipt by other ring nodes belonging to the ring is performed such that (1) a clockwise multipoint-to-point path (CWP) is defined such that every one of the ring nodes, including the ring node itself, belonging to the ring can be an ingress for the CWP and such that only the node is an egress for the CWP, and (2) an anti-clockwise multipoint-to-point path (ACP) is defined such that every one of the ring nodes, including the ring node itself, belonging to the ring can be an ingress for the ACP and such that only the node is an egress for the ACP.

§ 3. BRIEF DESCRIPTION OF THE DRAWINGS

FIGS. 13, 14A and 14B are example message formats consistent with the present description.

§ 4. DETAILED DESCRIPTION

Figure 1:
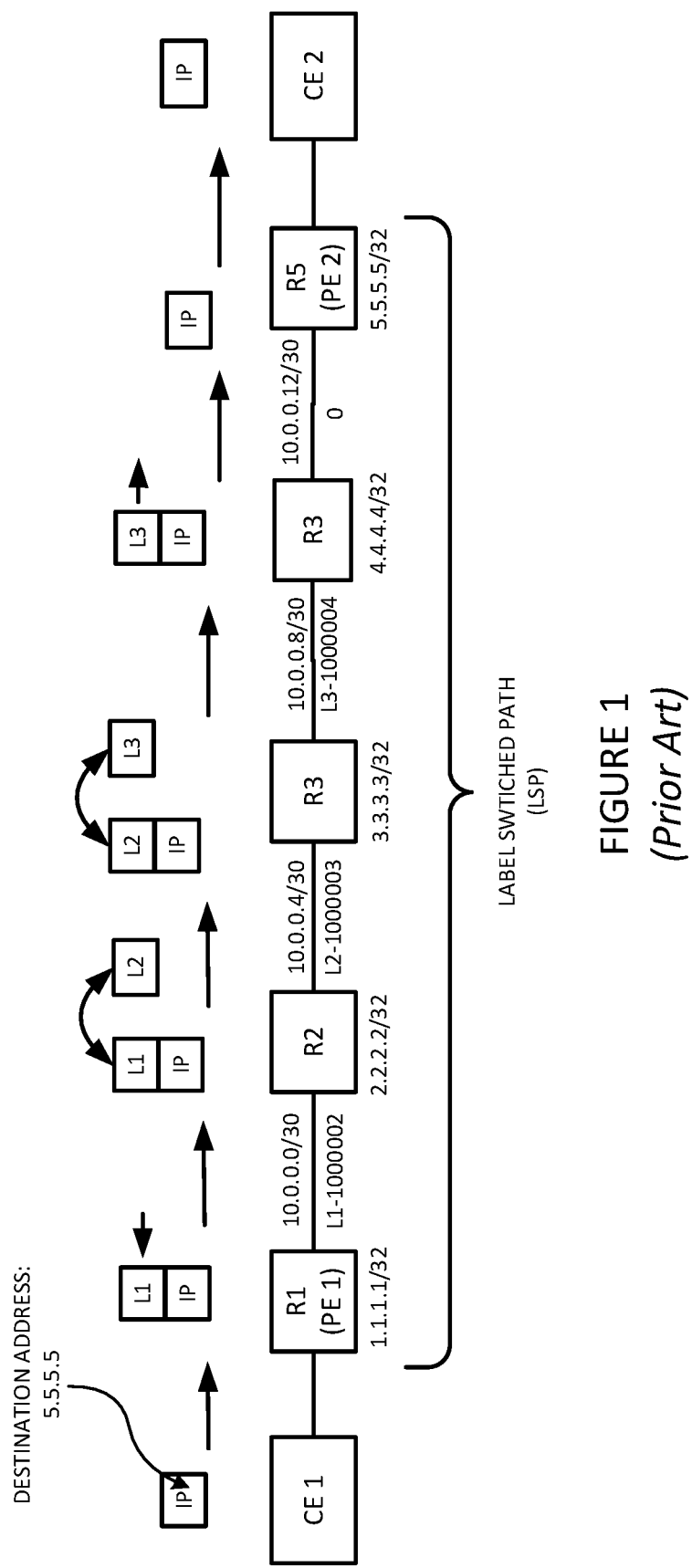
FIG. 1 illustrates an example of an LSP between an ingress router and an egress router.

The present disclosure may involve novel methods, apparatus, message formats, and/or data structures for provisioning and/or configuring CW and AC paths on a ring. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Definitions and Terminology

The following terms are used to define the taxonomy of a ring. A ring consists of a subset of n nodes $\{R\_i, 0<=i<n\}$. The direction from node $R\_i$ to $R\_i+1$ is defined as "clockwise" (CW) and the reverse direction is defined as "anti-clockwise" (AC). As there may be several rings in a graph, each ring is numbered with a distinct Ring ID (RID).

The following terminology is used for rings.

"Ring ID" (RID) is non-zero number that identifies a ring. It is unique in some scope of a Service Provider's network. A node may belong to multiple rings, each identified by its unique RID.

"Ring Node" is a member of a ring. Note that a node may belong to several rings.

"Node Index" is a logical numbering of nodes in a ring, from zero up to one less than the ring size. Node Index values are used purely for exposition in this application.

"Ring Master" is the ring node that initiates the ring identification process. Mastership may be indicated in the IGP by a two-bit field.

"Ring Neighbors" are nodes whose indices differ by one (modulo ring size).

"Ring Size" for a given instantiation of a ring is N. This can change as nodes are added or removed, or go up or down.

"Ring Links" are links that connect ring neighbors.

"Express Links" are links that connect non-neighboring ring nodes.

"Ring LSP" is an LSP in the ring. Each LSP in the ring is a multipoint to point LSP such that LSP can have multiple ingress nodes and one egress node.

"Ring Identification" is the process of discovering ring nodes, ring links, link directions, and express links.

"Ring SID" is a unique ring prefix segment identifier. Each ring node advertises two (2) unique Ring Prefix Segment Identifiers(Ring SIDs). A CW-Ring-SID is advertised by ring node to receive traffic in clockwise direction. an AC-Ring-SID is advertised by ring node to receive traffic in anti-clockwise direction.

§ 4.2 Example Method(s)

Figure 12:
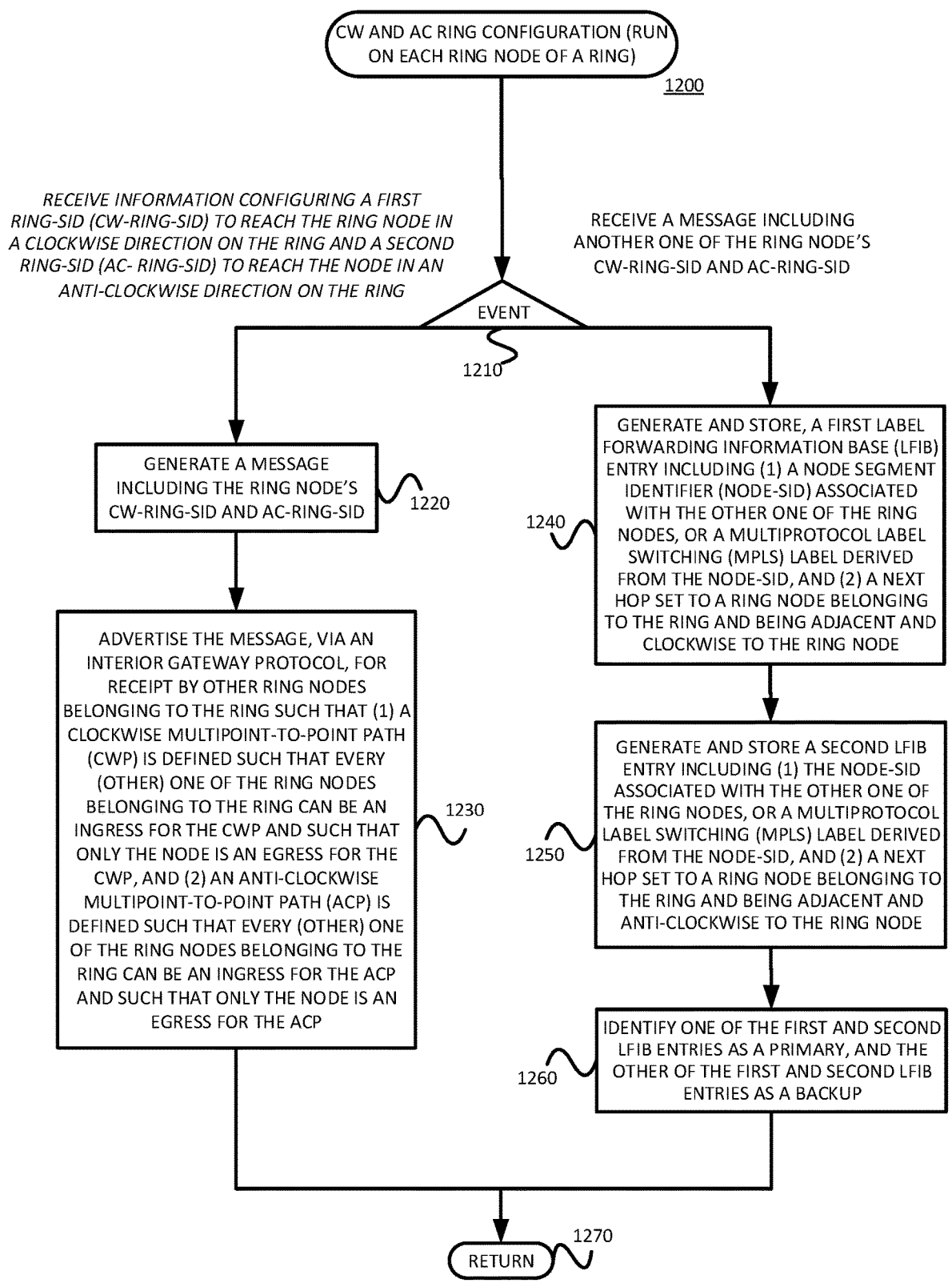
FIG. 12 is a flow diagram of an example method consistent with the present description.

FIG. 12 is a flow diagram of an example method 1200 for configuration of clockwise (CW) and anticlockwise (AC) rings on a node of a ring. The example method 1200 may be performed on each node of the ring. As shown by event 1210, different branches of the example method 1200 are performed in response to the occurrence of different events. (Event branch point 1210) For example, responsive to receiving information configuring two ring node segment identifiers (Ring-SIDs) on the ring node, wherein a first of the two Ring-SIDs (CW-Ring-SID) is to reach N in a clockwise direction on the ring and a second of the two Ring-SIDs (AC-Ring-SID) is to reach N in an anti-clockwise direction on the ring (the CW-Ring-SID and the AC-Ring-SID are unique within a source packet routing in networking (SPRING) domain including the ring), the left branch of the example method 1200 is performed. More specifically, the example method 1200 generates a message including the ring node's CW-Ring-SID and AC-Ring-SID. (Block 1220) The example method 1200 then advertises the message, via an interior gateway protocol, for receipt by other ring nodes belonging to the ring such that (1) a clockwise multipoint-to-point path (CWP) is defined such that every other one of the ring nodes belonging to the ring can be an ingress for the CWP and such that only the node is an egress for the CWP, and (2) an anti-clockwise multipoint-to-point path (ACP) is defined such that every other one of the ring nodes belonging to the ring can be an ingress for the ACP and such that only the node is an egress for the ACP. (Block 1230) The example method 1200 is then left. (Return node 1270)

Referring back to event branch point 1210, in response to receiving, by the node, a message including another one of the ring node's CW-Ring-SID and AC-Ring-SID, the right branch of the example method 1200 is performed. More specifically, the example method 1200 generates and stores, a first label forwarding information base (LFIB) entry including (1) a node segment identifier (Node-SID) associated with the other one of the ring nodes, or a multiprotocol label switching (MPLS) label derived from the Node-SID, and (2) a next hop set to a ring node belonging to the ring and being adjacent and clockwise to the ring node. (Block 1240) The example method 1200 also generates and stores, a second LFIB entry including (1) the Node-SID associated with the other one of the ring nodes, or a multiprotocol label switching (MPLS) label derived from the Node-SID, and (2) a next hop set to a ring node belonging to the ring and being adjacent and anti-clockwise to the ring node. (Block 1250) Note that one of the first and second LFIB entries is identified as a primary, and the other of the first and second LFIB entries is identified as a backup. (Block 1260) The example method 1200 is then left. (Return node 1370)

Referring back to blocks 1240 and 1250, in some example embodiments, the MPLS label is derived from the Node-SID using a minimum or maximum value from a segment routing global block (SRGB) defining a range of label values (e.g., minimum value plus the Node-SID, or maximum value minus the Node-SID).

In some example embodiments, the configuration information including the CW-Ring-SID and the AC-Ring-SID may be generated by a segment routing mapping server (SRMS) using a reserved block of Ring-SID indices. Alternatively, the configuration information including the CW-Ring-SID and the AC-Ring-SID may be generated by a Dynamic Host Configuration Protocol (DHCP) server (e.g., per the document, Droms, "Dynamic Host Configuration Protocol," Request for Comments 2131 (Internet Engineering Task Force, March 1997)(referred to as "RFC 2131" and incorporated herein by reference), which may be updated by RFCs 3396, 4361, 5494 and 6842 (each of which is incorporated herein by reference)). Alternatively, the configuration information including the CW-Ring-SID and the AC-Ring-SID may be generated by a Path Computation Element Communication Protocol (PCEP) server (e.g., per the document, Vasseur, Ed. and Le Roux, Ed., "Path Computation Element (PCE) Communication Protocol (PCEP)," Request for Comments 5440 (Internet Engineering Task Force, March 2019)(referred to as "RFC 5440" in incorporated herein by reference), which may be updated by RFCs 7896, 8253 and 8356 (each of which is incorporated herein by reference)).

Referring back to block 1220, in some example embodiments, the message including the ring node's CW-Ring-SID and AC-Ring-SID may further include information for identifying an algorithm used to derive a next hop to reach the ring node. For example, the algorithm used to derive a next hop to reach the ring node may specify the use of a specified one of a CW next hop and an AC next hop.

Referring back to block 1230, in some example embodiments, the message may be advertised by flooding it over an interior gateway protocol (IGP) domain. As one example, message may be advertised within an explicit prefix type-length-value (TLV) interior gateway protocol (IGP) advertisement. As another example, the message may be advertised within a SID/label binding type-length-value (TLV) interior gateway protocol (IGP) advertisement.

Referring back to block 1220, in some example embodiments, each of the ring node's CW-Ring-SID and AC-Ring-SID included in the message may be expressed as a label value. Alternatively, each of the ring node's CW-Ring-SID and AC-Ring-SID included in the message is expressed as an index defining an offset from one of a start or end of a predefined segment routing global block (SRGB) of labels.

Referring back to block 1230, in some example embodiments, the act of advertising the message, via an interior gateway protocol, for receipt by other ring nodes belonging to the ring is performed such that (1) a clockwise multipoint-to-point path (CWP) is defined such that every one of the ring nodes, including the ring node itself, belonging to the ring can be an ingress for the CWP and such that only the node is an egress for the CWP, and (2) an anti-clockwise multipoint-to-point path (ACP) is defined such that every one of the ring nodes, including the ring node itself, belonging to the ring can be an ingress for the ACP and such that only the node is an egress for the ACP.

§ 4.3 Example Message Format(s)

FIG. 13 illustrates an example Ring Node TLV message format 1300 consistent with the present description. As shown, the example Ring Node TLV message format 1300 includes an 1-octet type field 1310, an 1-octet length field 1320, a 32-bit Ring ID (RID) field 1330+1330', a 1-octet field 1340 including node flags, and sub-TLVs (if any) 1350.

FIG. 14A illustrates an example Ring-SID sub-TLV message format 1350' (which may be carried in field 1350 of FIG. 13) consistent with the present description. As shown, the example Ring-SID sub-TLV message 1350' may include a 1-octet type field 1410, a 1-octet length field 1420, a 1-octet flags field 1430, a 1-octet algorithm field 1440, a 32-bit Ring-ID (RID) field 1450, and a variable length SID field 1460.

The length field 1420 may be, for example, 9 or 10 depending on the size of the SID (which may be an index to a label block, or an absolute label).

The flags field 1430 may include a 1-bit D-Flag (or Direction Flag), a 1-bit NP-Flag (or No-PHP-Flag), a 1-bit M-Flag (or Mapping Server Flag), a 1-bit E-Flag (Explicit Null Flag) and a 1-bit V-Flag (Value/Index Flag). The D-Flag (Direction Flag) identifies the direction towards the downstream neighbors. The possible values of the D-Flag are 0 (indicating CW next-hop(s) neighbor(s) derived after the completion of ring identification phase) and 1 (indicating ACW next-hop(s) neighbor(s) derived after the completion of ring identification phase). If set, the NP-Flag (No-PHP Flag) indicates that the penultimate hop must not pop the Prefix-SID before delivering packets to the node that advertised the Ring-SID. If the M-Flag (Mapping Server Flag) is set, then the SID was advertised by a Segment Routing Mapping Server, e.g., as described in the document, Bashandy, et al, "Segment Routing interworking with LDP", draft-ietf-spring-segment-routing-ldp-interop-15 (Internet Engineering Task Force, September 2018) (incorporated herein by reference). If the E-Flag (Explicit-Null Flag) is set, then any upstream neighbor of the Prefix-SID originator must replace the Prefix-SID with the Explicit-NULL label (0 for IPv4) before forwarding the packet. If the V-Flag (Value/Index Flag) is set, then the Prefix-SID carries an absolute value. If not set, then the Ring-SID carries an index (which is used as an offset to a label base). Other bits are reserved (to be set to zero when sent and to be ignored when received)

The algorithm field 1440 is used to identify the algorithm to be used (e.g., by the Ring node) to derive the downstream member ring next-hop(s) to reach a specific ring node. For example, a value of 0 in this field may indicate that all next-hop(s) derived from the completion of ring identification process are to be included. The D-Flag indicates whether CW or ACW are to be considered. Other user-defined algorithms identifiers from the range 128-255 can be defined and used as described in the document, Psenak, et al, "IGP Flexible Algorithm", draft-ietf-lsr-flex-algo-03 (Internet Engineering Task Force, July 2019) (incorporated herein by reference).

The Ring-ID field 1450 is used to carry the Ring ID that the Ring-SID(s) is advertised for.

The Ring-SID field 1460 must be unique within a given IGP domain (when the L-flag is not set). The SID/Index/Label may be set as defined in the document, Previdi, et al, "IS-IS Extensions for Segment Routing", draft-ietf-isis-segment-routing-extensions-25 (Internet Engineering Task Force, May 2019)(incorporated herein by reference).

§ 4.4 Example Apparatus

Figure 2:
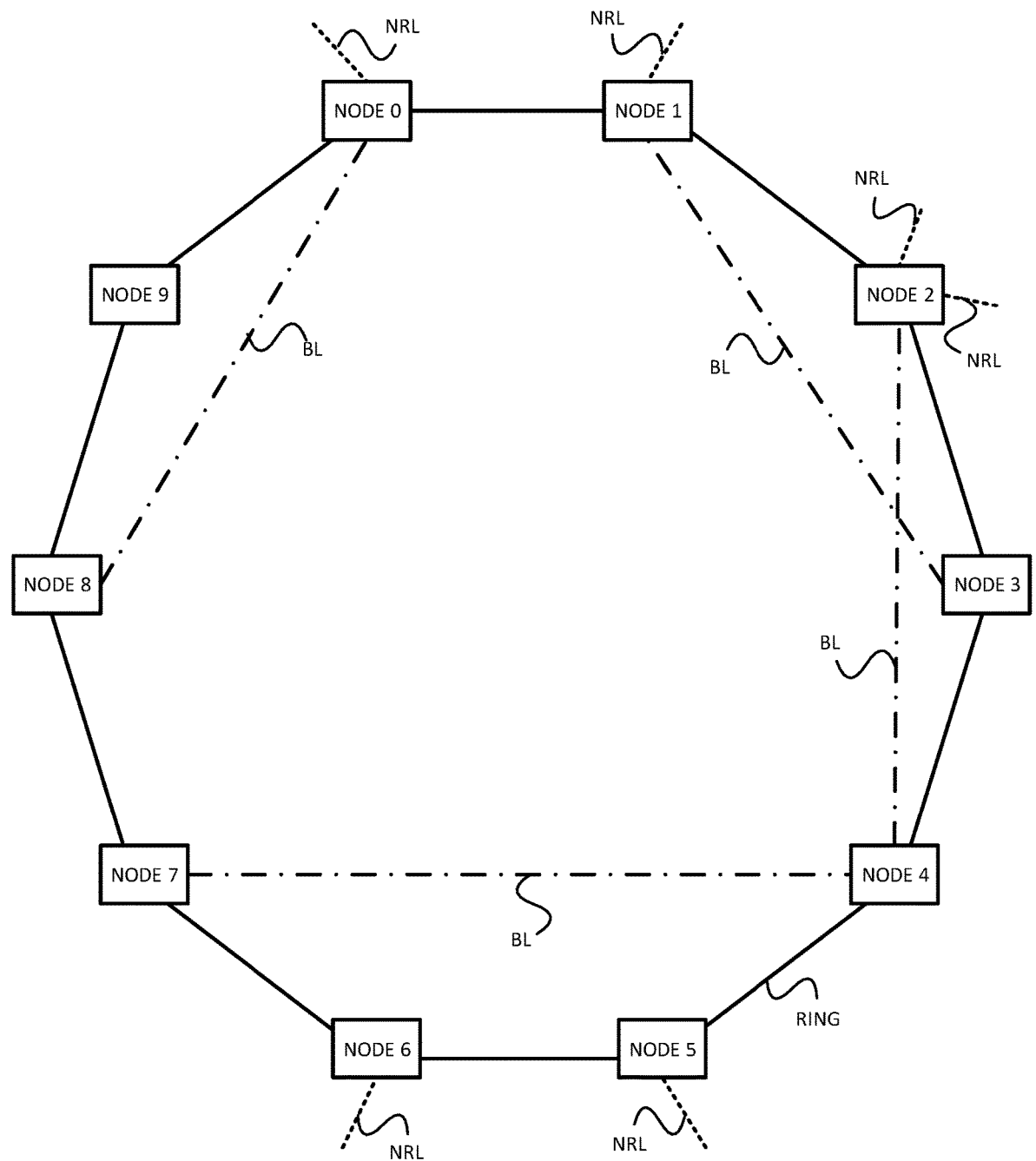
FIG. 2 illustrates an example resilient MPLS ring.
Figure 3:
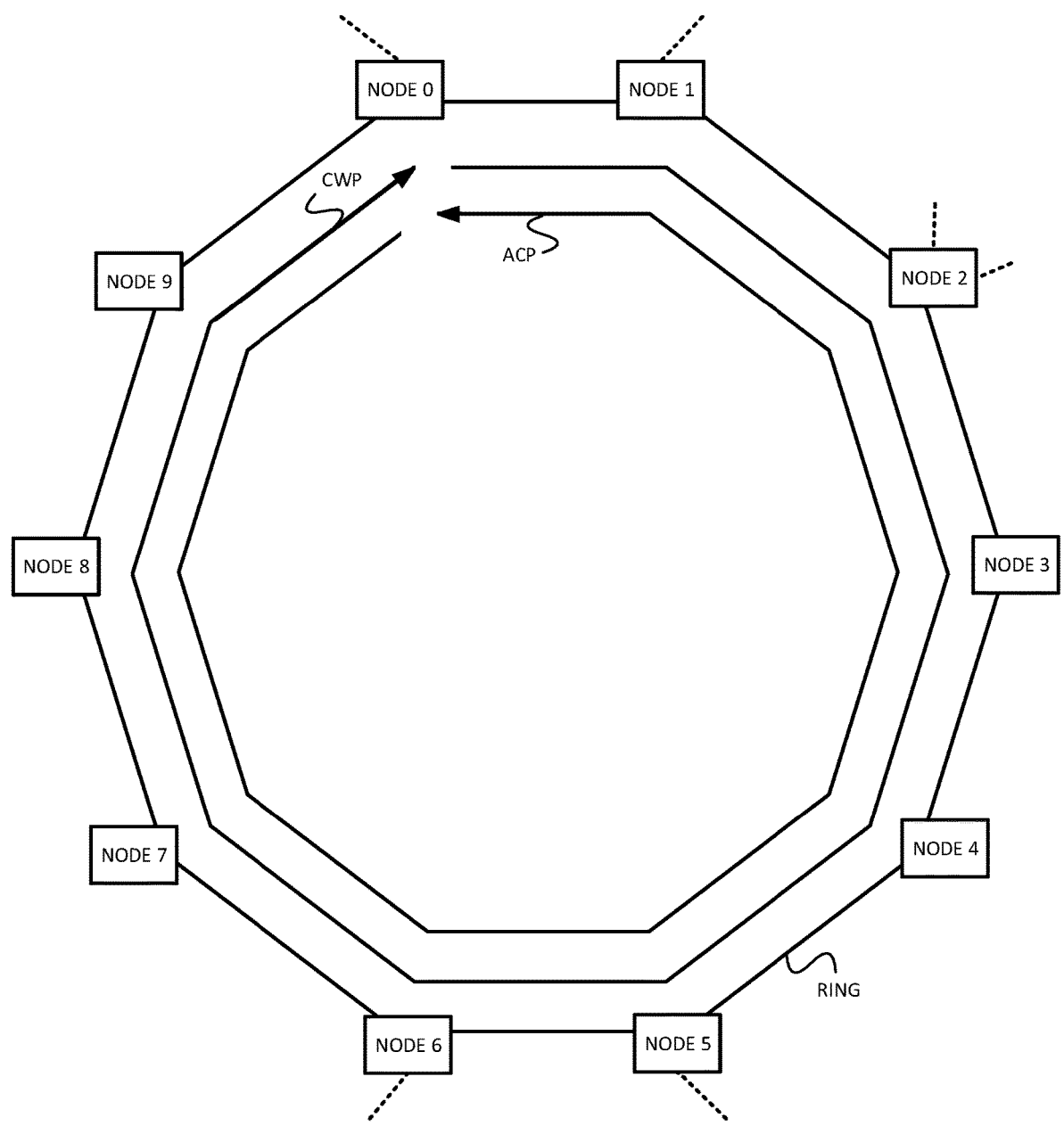
FIG. 3 illustrates CW and AC sub-LSPs for a node of the resilient MPLS ring of FIG. 2.
Figure 4:
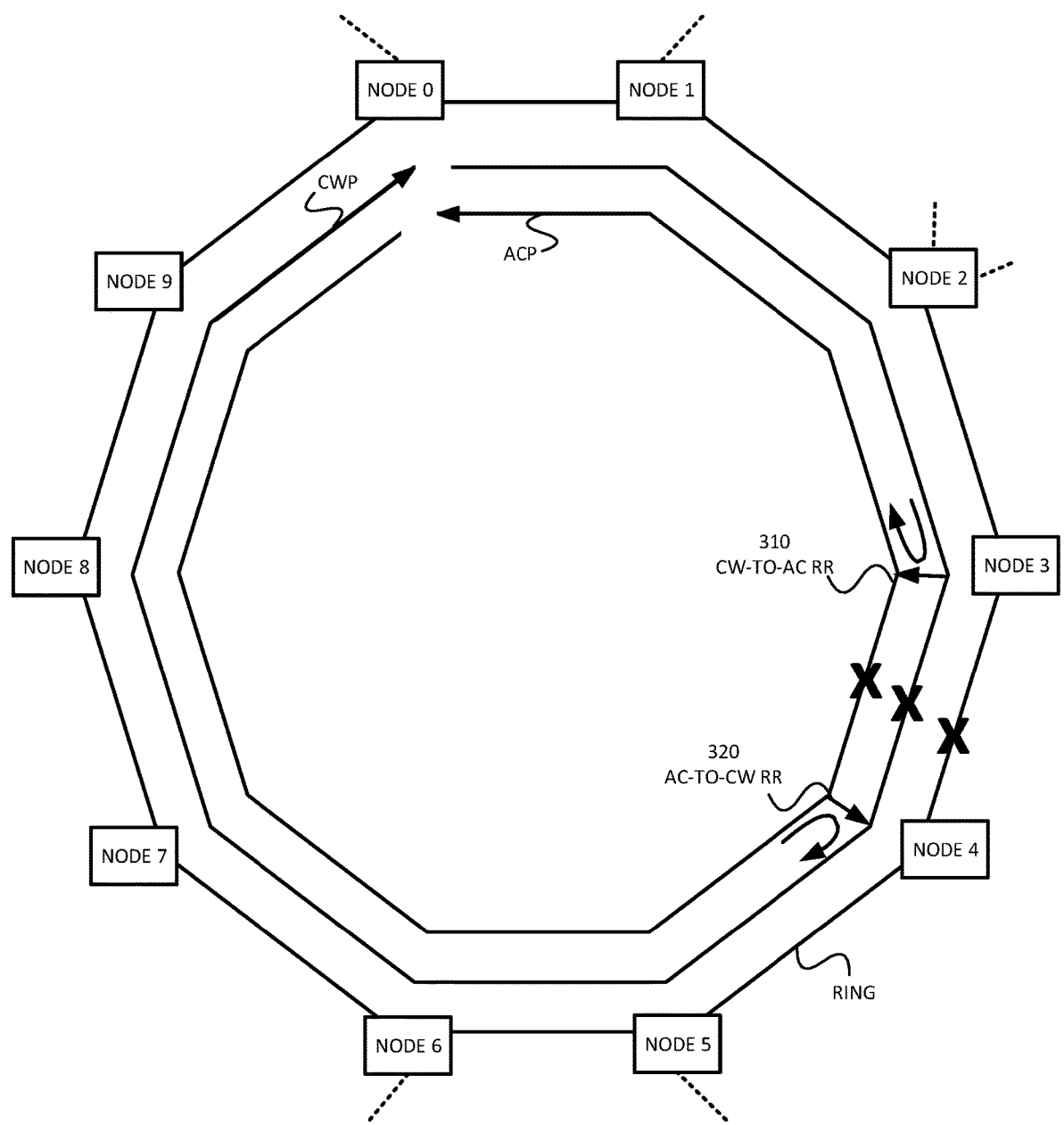
FIG. 4 illustrates a local repair using a CW sub-LSP and an AC sub-LSP for a node of the resilient MPLS ring of FIG. 2.
Figure 5:
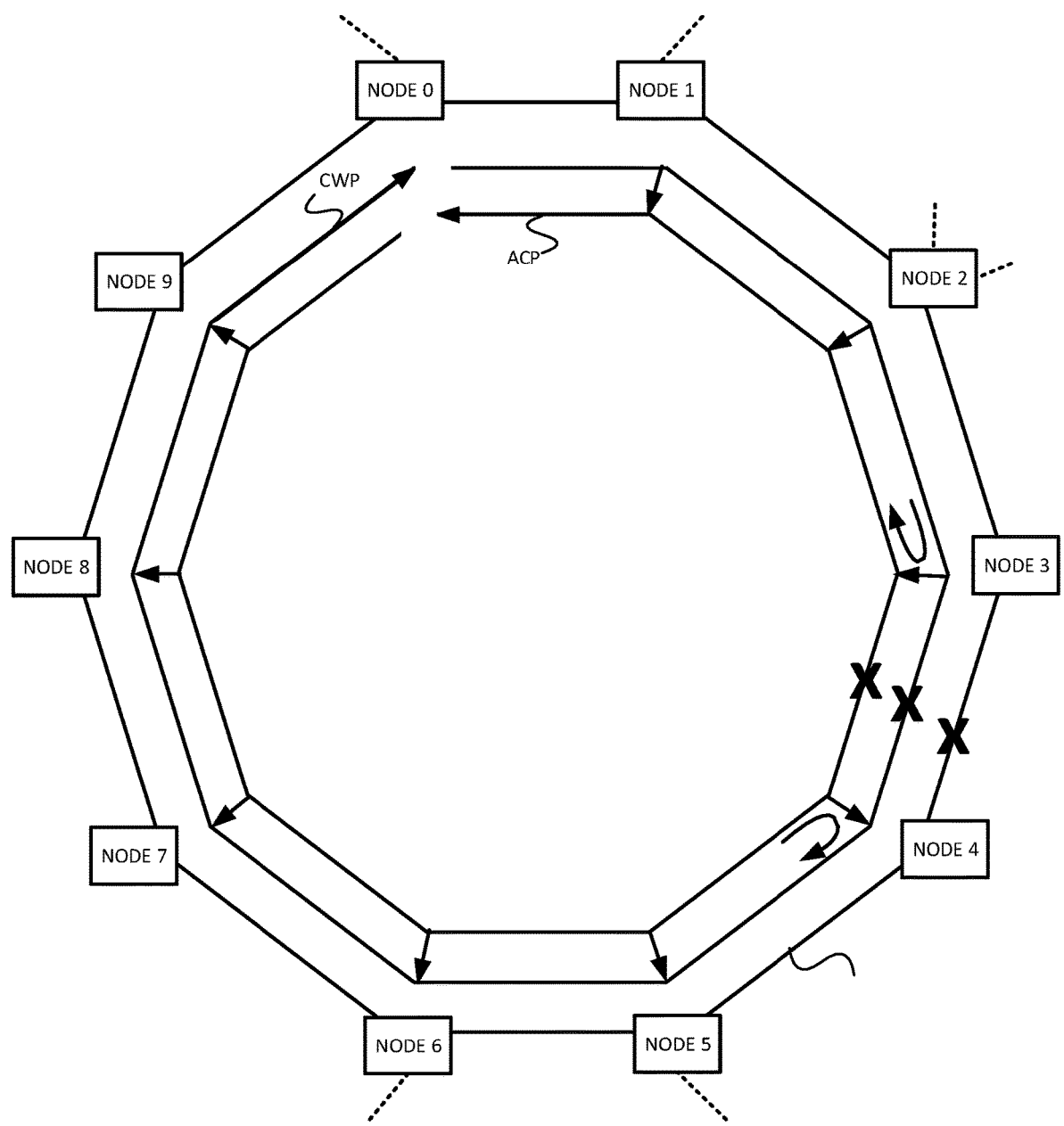
FIG. 5 illustrates a global repair using a CW sub-LSP and an AC sub-LSP for a node of the resilient MPLS ring of FIG. 2.
Figure 6:
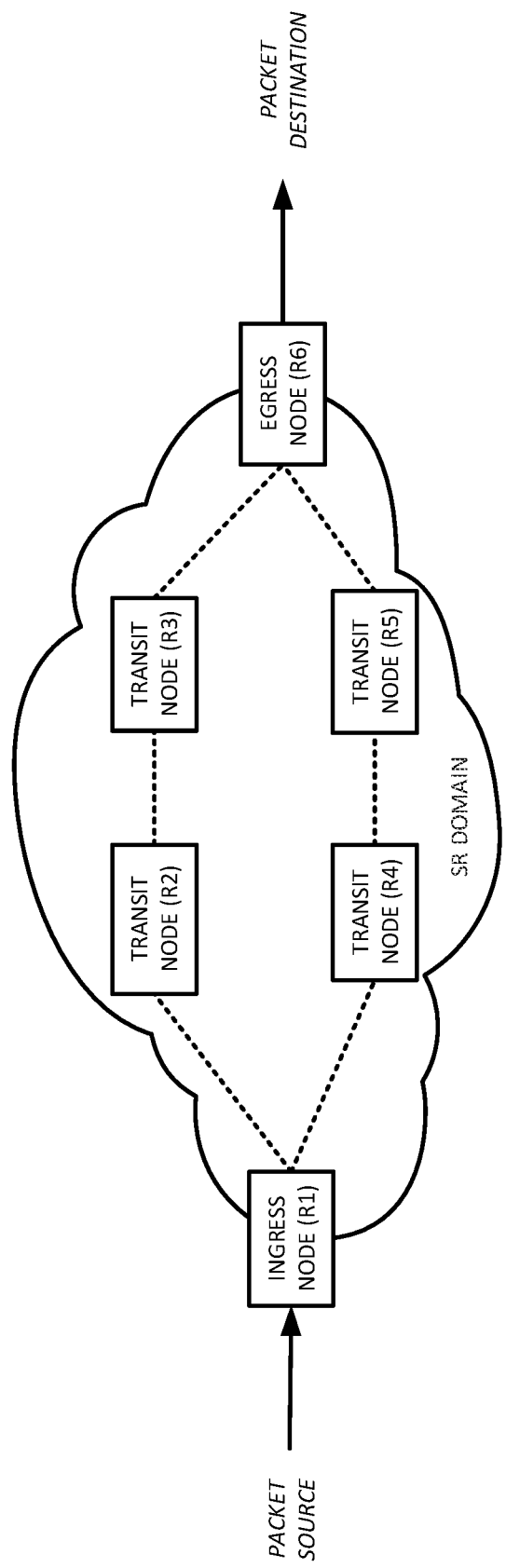
FIG. 6 is an example network used to illustrate an SR domain.
Figure 7:
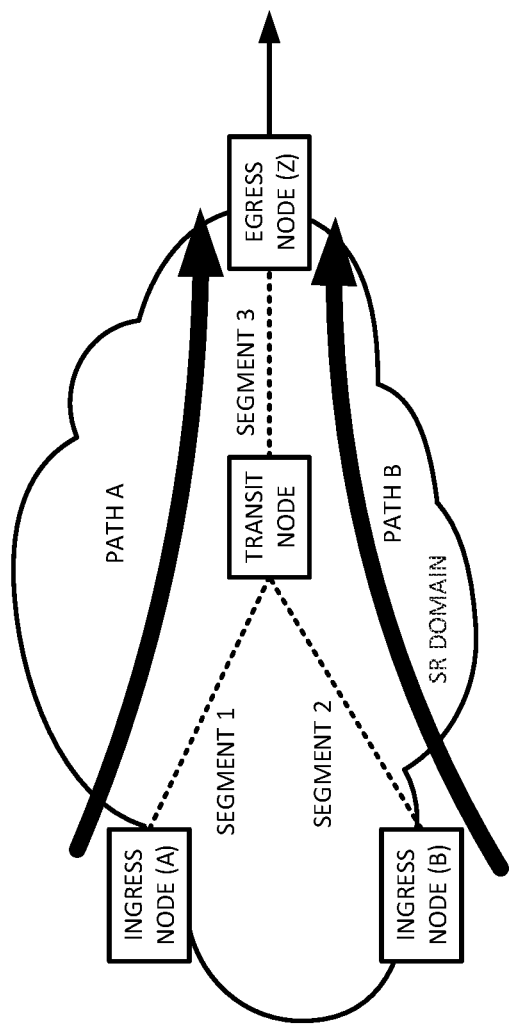
FIG. 7 is an example network used to illustrate SR paths through an SR domain.
Figure 8:
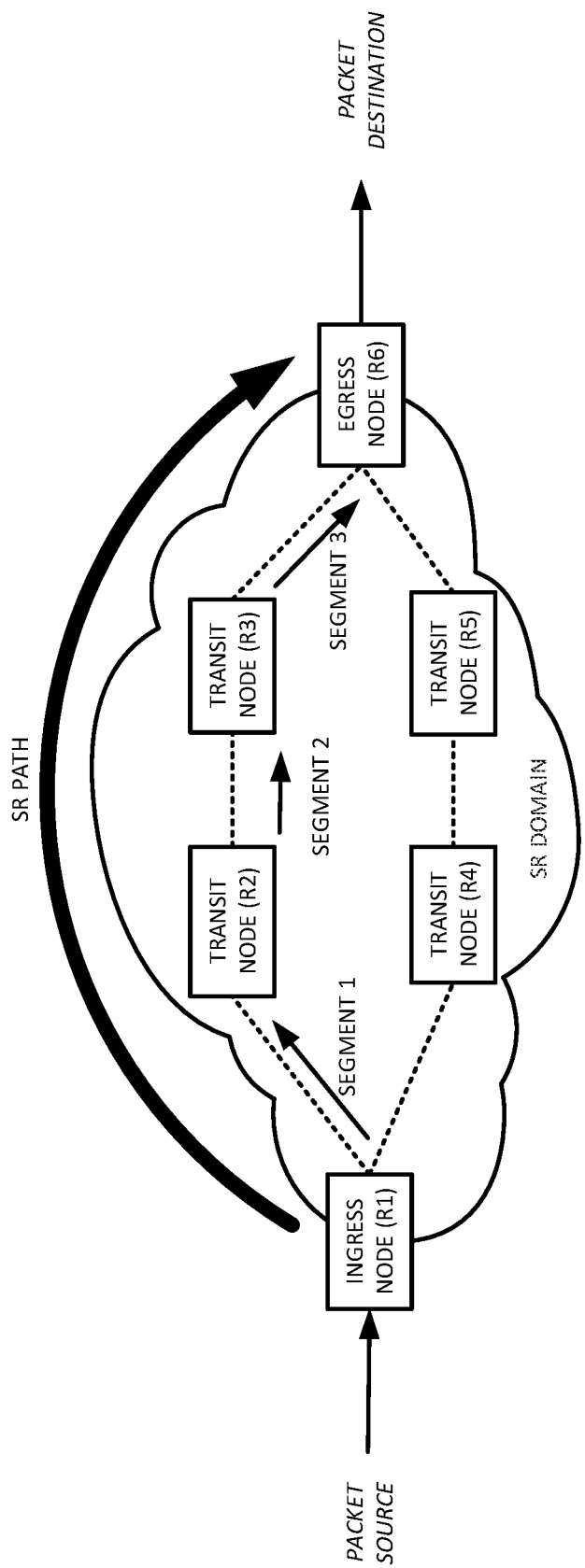
FIG. 8 is an example network used to illustrate adjacency segments in an SR domain.
Figure 9A:
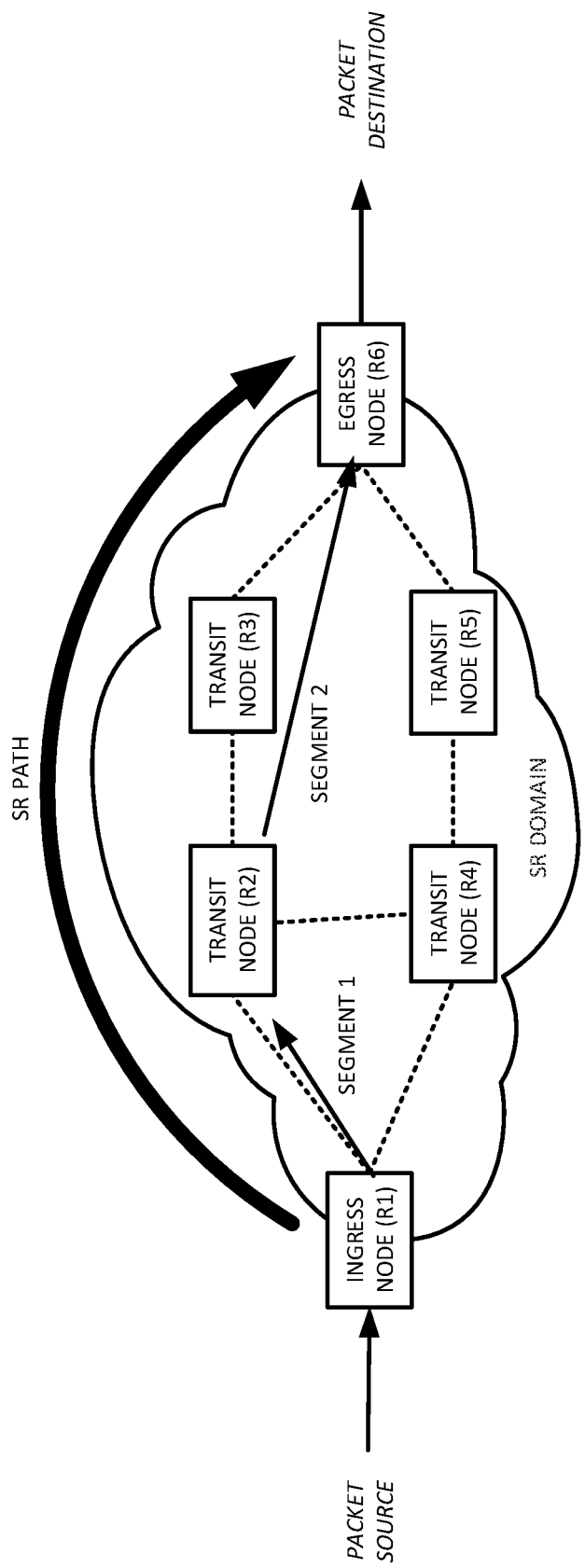
FIGS. 9A and 9B are an example network used to illustrate prefix segments in an SR domain.
Figure 9B:
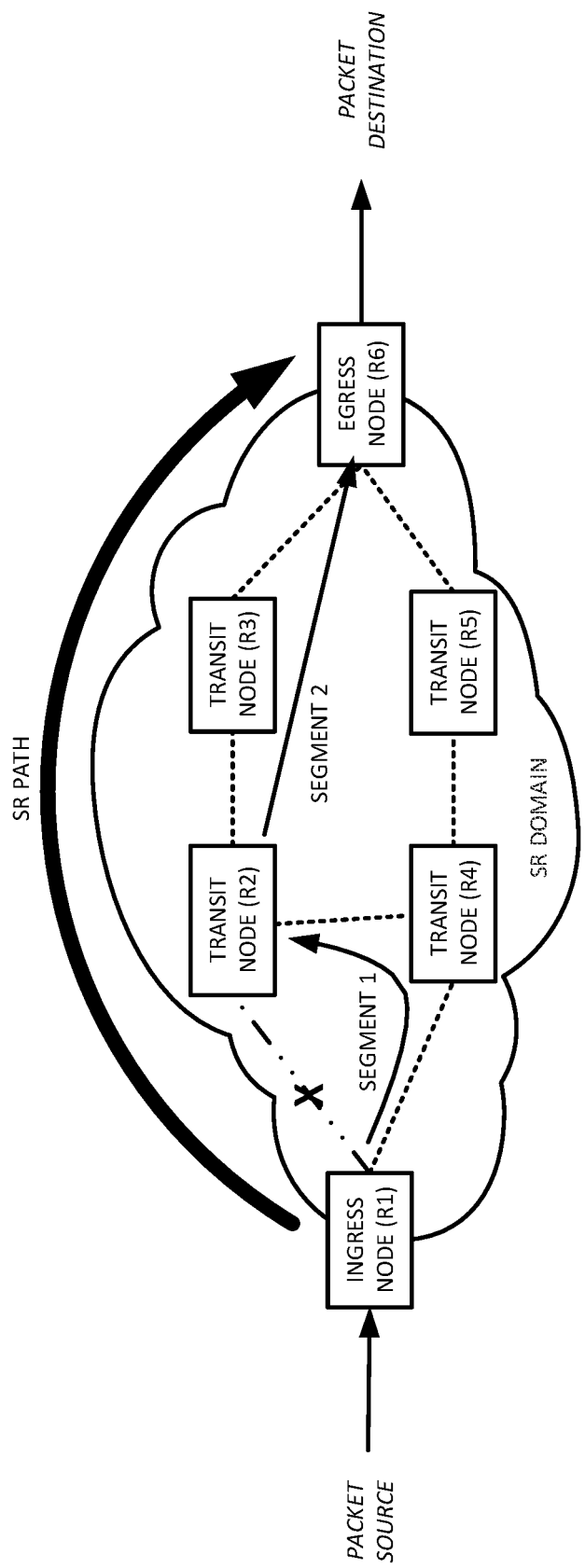
Figure 10:
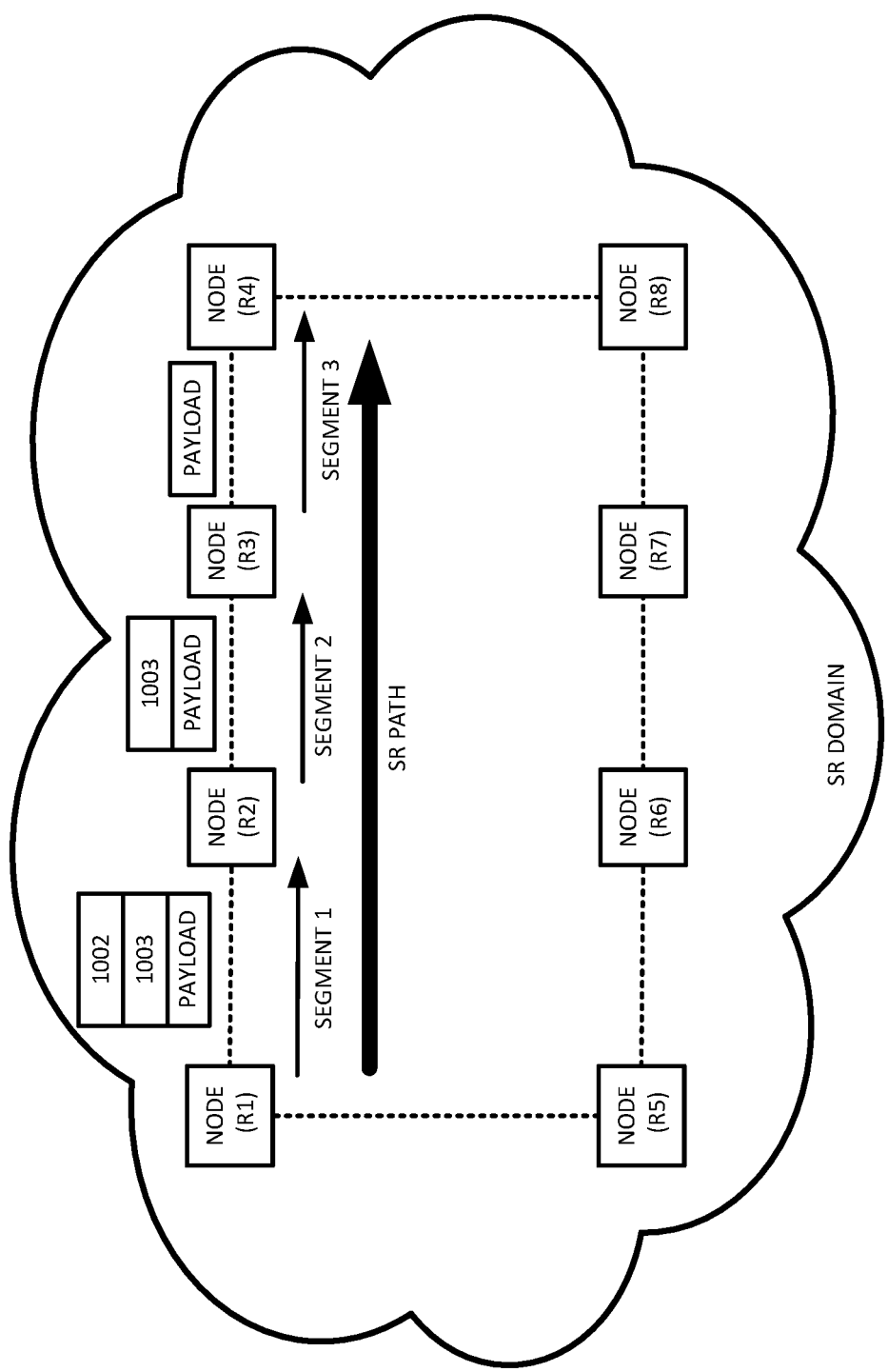
FIG. 10 is an example network used to illustrate the use of MPLS labels derived from adjacency segments.
Figure 11:
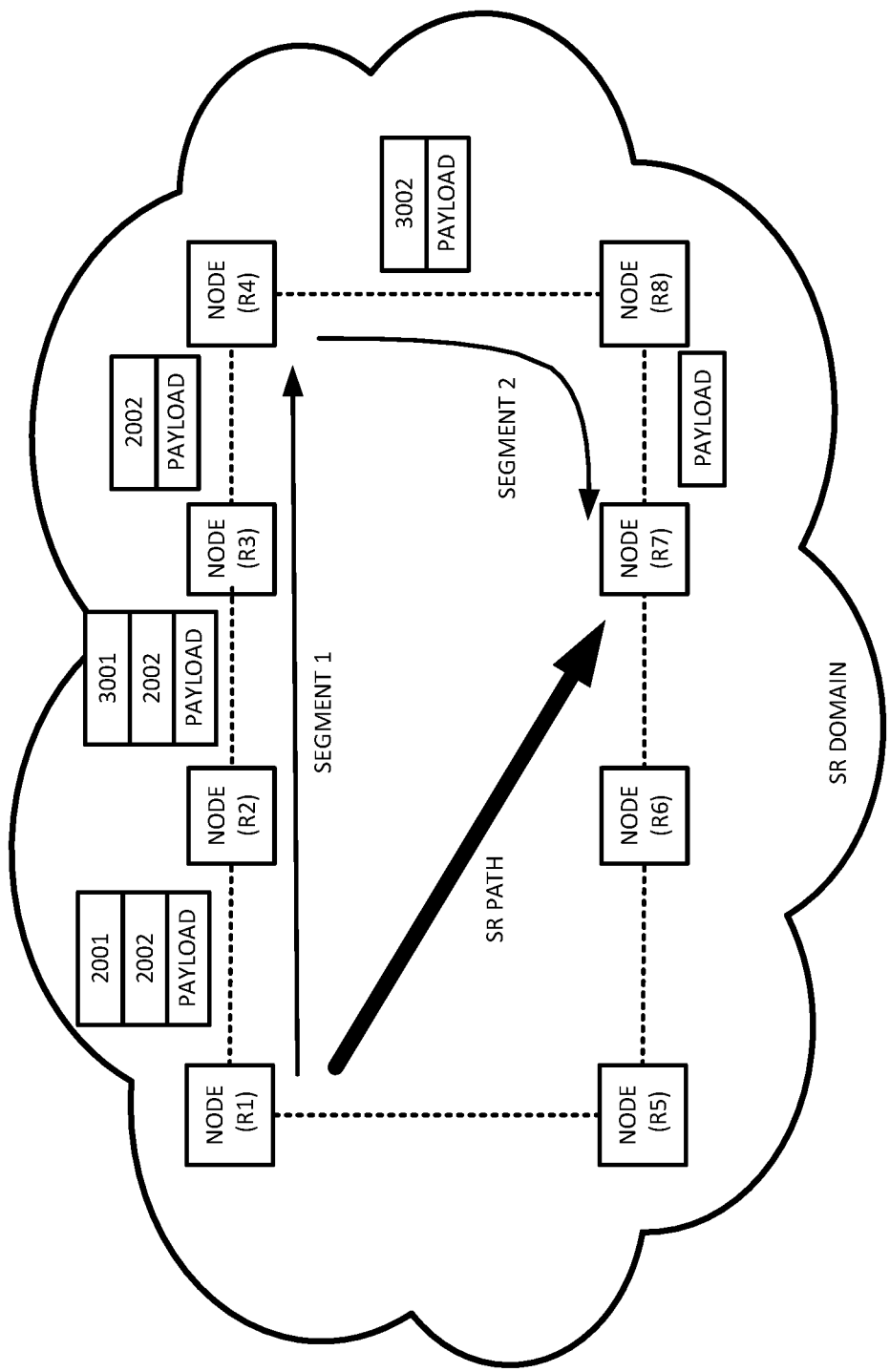
FIG. 11 is an example network used to illustrate the use of MPLS labels derived from prefix segments.

The method(s) described in this application may be performed by, and the data described in this application may be stored, received and/or transmitted by, a router such as the one described (e.g., with reference to FIG. 2) in the '059 application.

Figure 15:
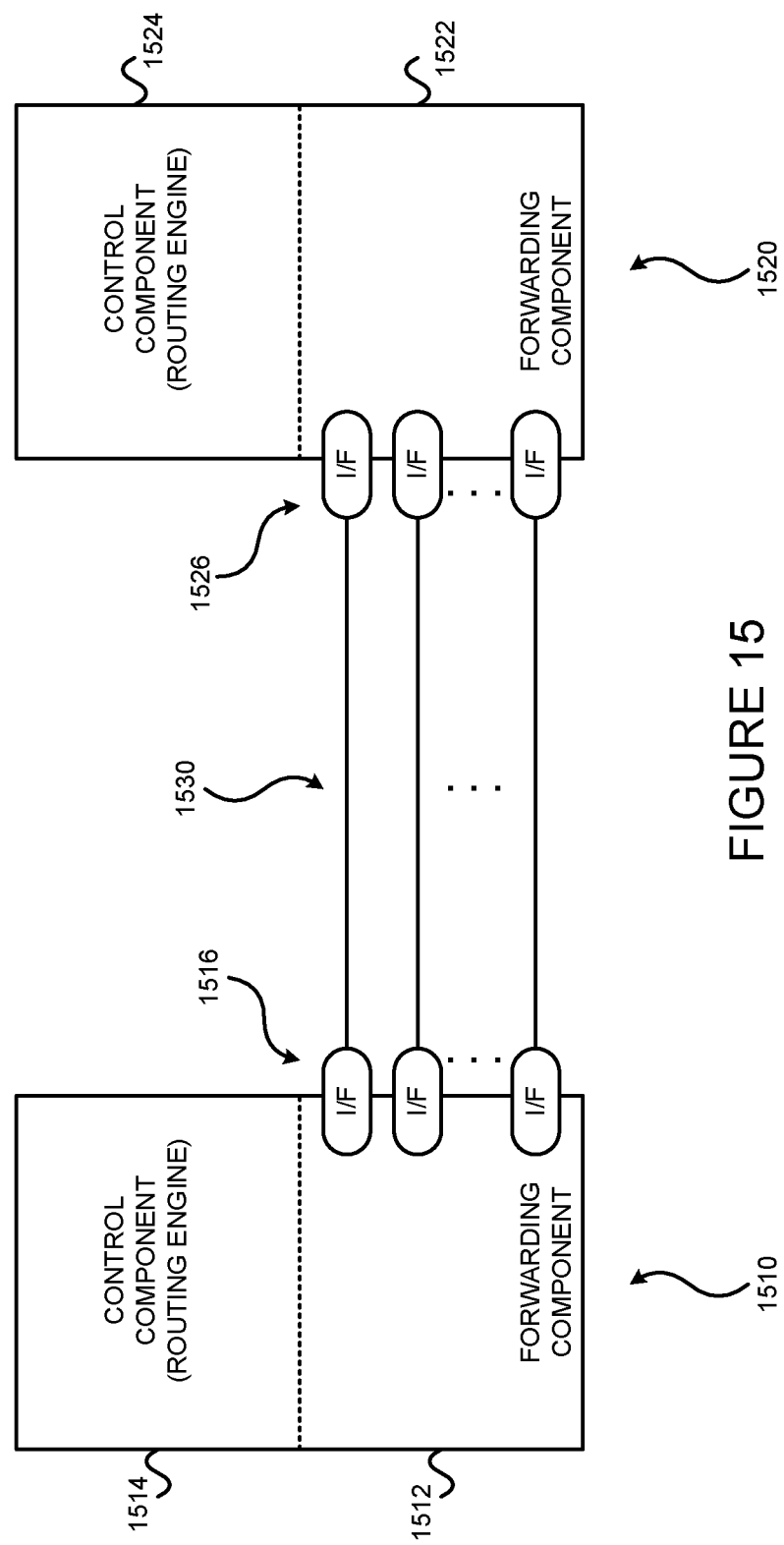
FIG. 15 illustrates an example environment including two systems coupled via communications links.

FIG. 15 illustrates two data forwarding systems 1510 and 1520 coupled via communications links 1530. The links may be physical links or "wireless" links. The data forwarding systems 1510,1520 may be nodes, such as routers for example. If the data forwarding systems 1510,1520 are example routers, each may include a control component (e.g., a routing engine) 1514,1524 and a forwarding component 1512, 1522. Each data forwarding system 1510,1520 includes one or more interfaces 1516, 1526 that terminate one or more communications links 1530. Any two of ring nodes may be implemented on device 1510 and/or 1520. The example method 1200 described above may be implemented in the control component 1514 and/or 1524 of device 1510 and/or 1520.

As just discussed above, and referring to FIG. 16, some example routers 1600 include a control component (e.g., routing engine) 1610 and a packet forwarding component (e.g., a packet forwarding engine) 1690.

The control component 1610 may include an operating system (OS) kernel 1620, routing protocol process(es) 1630, label-based forwarding protocol process(es) 1640, interface process(es) 1650, user interface (e.g., command line interface) process(es) 1660, and chassis process(es) 1670, and may store routing table(s) 1639, label forwarding information 1645, and forwarding (e.g., route-based and/or label-based) table(s) 1680. As shown, the routing protocol process(es) 1630 may support routing protocols such as the routing information protocol ("RIP") 1631, the intermediate system-to-intermediate system protocol ("IS-IS") 1632, the open shortest path first protocol ("OSPF") 1633, the enhanced interior gateway routing protocol ("EIGRP") 1634 and the border gateway protocol ("BGP") 1635, and the label-based forwarding protocol process(es) 1640 may support protocols such as BGP 1635, the label distribution protocol ("LDP") 1636 and the resource reservation protocol ("RSVP") 1637. Some aspects of the example embodiments described (e.g., example method 1200) may be implemented in the intermediate system-to-intermediate system protocol ("IS-IS") 1632, and/or the open shortest path first protocol ("OSPF") 1633. One or more components (not shown) may permit a user 1665 to interact with the user interface process(es) 1660. Similarly, one or more components (not shown) may permit an outside device to interact with one or more of the router protocol process(es) 1630, the label-based forwarding protocol process(es) 1640, the interface process(es) 1650, and the chassis process(es) 1670, via SNMP 1685, and such processes may send information to an outside device via SNMP 1685.

The packet forwarding component 1690 may include a microkernel 1692, interface process(es) 1693, distributed ASICs 1694, chassis process(es) 1695 and forwarding (e.g., route-based and/or label-based) table(s) 1696, such as a label-forwarding information base (LFIB) as described herein.

Figure 16:
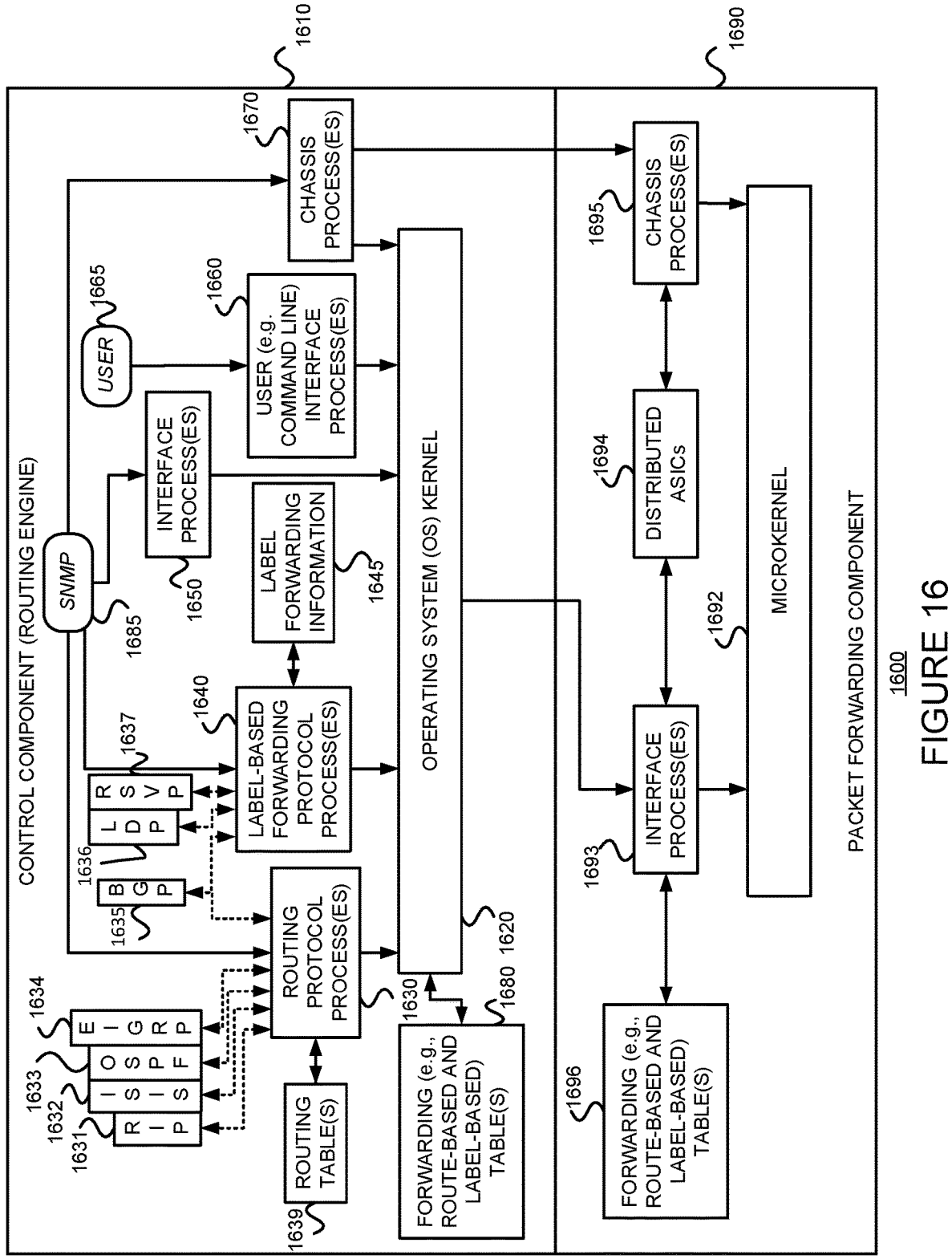
FIG. 16 is a block diagram of an example router on which the example methods of the present description may be implemented.

In the example router 1600 of FIG. 16, the control component 1610 handles tasks such as performing routing protocols, performing label-based forwarding protocols, control packet processing, etc., which frees the packet forwarding component 1690 to forward received packets quickly. That is, received control packets (e.g., routing protocol packets and/or label-based forwarding protocol packets) are not fully processed on the packet forwarding component 1690 itself, but are passed to the control component 1610, thereby reducing the amount of work that the packet forwarding component 1690 has to do and freeing it to process packets to be forwarded efficiently. Thus, the control component 1610 is primarily responsible for running routing protocols and/or label-based forwarding protocols, maintaining the routing tables and/or label forwarding information, sending forwarding table updates to the packet forwarding component 1690, and performing system management. The example control component 1610 may handle routing protocol packets, provide a management interface, provide configuration management, perform accounting, and provide alarms. The processes 1630, 1640, 1650, 1660 and 1670 may be modular, and may interact with the OS kernel 1620. That is, nearly all of the processes communicate directly with the OS kernel 1620. Using modular software that cleanly separates processes from each other isolates problems of a given process so that such problems do not impact other processes that may be running. Additionally, using modular software facilitates easier scaling.

Still referring to FIG. 16, the example OS kernel 1620 may incorporate an application programming interface ("API") system for external program calls and scripting capabilities. The control component 1610 may be based on an Intel PCI platform running the OS from flash memory, with an alternate copy stored on the router's hard disk. The OS kernel 1620 is layered on the Intel PCI platform and establishes communication between the Intel PCI platform and processes of the control component 1610. The OS kernel 1620 also ensures that the forwarding tables 1696 in use by the packet forwarding component 1690 are in sync with those 1680 in the control component 1610. Thus, in addition to providing the underlying infrastructure to control component 1610 software processes, the OS kernel 1620 also provides a link between the control component 1610 and the packet forwarding component 1690.

Referring to the routing protocol process(es) 1630 of FIG. 16, this process(es) 1630 provides routing and routing control functions within the platform. In this example, the RIP 1631, ISIS 1632, OSPF 1633 and EIGRP 1634 (and BGP 1635) protocols are provided. Naturally, other routing protocols may be provided in addition, or alternatively. Similarly, the label-based forwarding protocol process(es) 1640 provides label forwarding and label control functions. In this example, the LDP 1636 and RSVP 1637 (and BGP 1635) protocols are provided. Naturally, other label-based forwarding protocols (e.g., MPLS, segment routing or SPRING, etc.) may be provided in addition, or alternatively. In the example router 1600, the routing table(s) 1639 is produced by the routing protocol process(es) 1630, while the label forwarding information 1645 is produced by the label-based forwarding protocol process(es) 1640.

Still referring to FIG. 16, the interface process(es) 1650 performs configuration of the physical interfaces (Recall, e.g., 1616 and 1626 of FIG. 16.) and encapsulation. In the example router 1600, the example method 1200 consistent with the present disclosure may be implemented in the control component 1610, in the routing protocol processes 1630.

The example control component 1610 may provide several ways to manage the router. For example, it 1610 may provide a user interface process(es) 1660 which allows a system operator 1665 to interact with the system through configuration, modifications, and monitoring. The SNMP 1685 allows SNMP-capable systems to communicate with the router platform. This also allows the platform to provide necessary SNMP information to external agents. For example, the SNMP 1685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1610, thereby avoiding slowing traffic forwarding by the packet forwarding component 1690.

Although not shown, the example router 1600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1660 via a console port, an auxiliary port, and/or a management Ethernet port. As noted, the interval may be configured using the CLI. Configure information, such as that described with reference to example method 1200, may be received via one or more interfaces. Such configuration information may be entered manually, or via a server (such as a SRMS, a DHCP server, and/or a PCEP server.

The packet forwarding component 1690 is responsible for properly outputting received packets as quickly as possible. If there is no entry in the forwarding table for a given destination or a given label and the packet forwarding component 1690 cannot perform forwarding by itself, it 1690 may send the packets bound for that unknown destination off to the control component 1610 for processing. The example packet forwarding component 1690 is designed to perform Layer 2 and Layer 3 switching, route lookups, and rapid packet forwarding.

As shown in FIG. 16, the example packet forwarding component 1690 has an embedded microkernel 1692, interface process(es) 1693, distributed ASICs 1694, and chassis process(es) 1695, and stores a forwarding (e.g., route-based and/or label-based) table(s) 1696. The microkernel 1692 interacts with the interface process(es) 1693 and the chassis process(es) 1695 to monitor and control these functions. The interface process(es) 1692 has direct communication with the OS kernel 1620 of the control component 1610. This communication includes forwarding exception packets and control packets to the control component 1610, receiving packets to be forwarded, receiving forwarding table updates, providing information about the health of the packet forwarding component 1690 to the control component 1610, and permitting configuration of the interfaces from the user interface (e.g., CLI) process(es) 1660 of the control component 1610. The stored forwarding table(s) 1696 is static until a new one is received from the control component 1610. The interface process(es) 1693 uses the forwarding table(s) 1696 to look up next-hop information. The interface process(es) 1693 also has direct communication with the distributed ASICs 1694. Finally, the chassis process(es) 1695 may communicate directly with the microkernel 1692 and with the distributed ASICs 1694.

Figure 17:
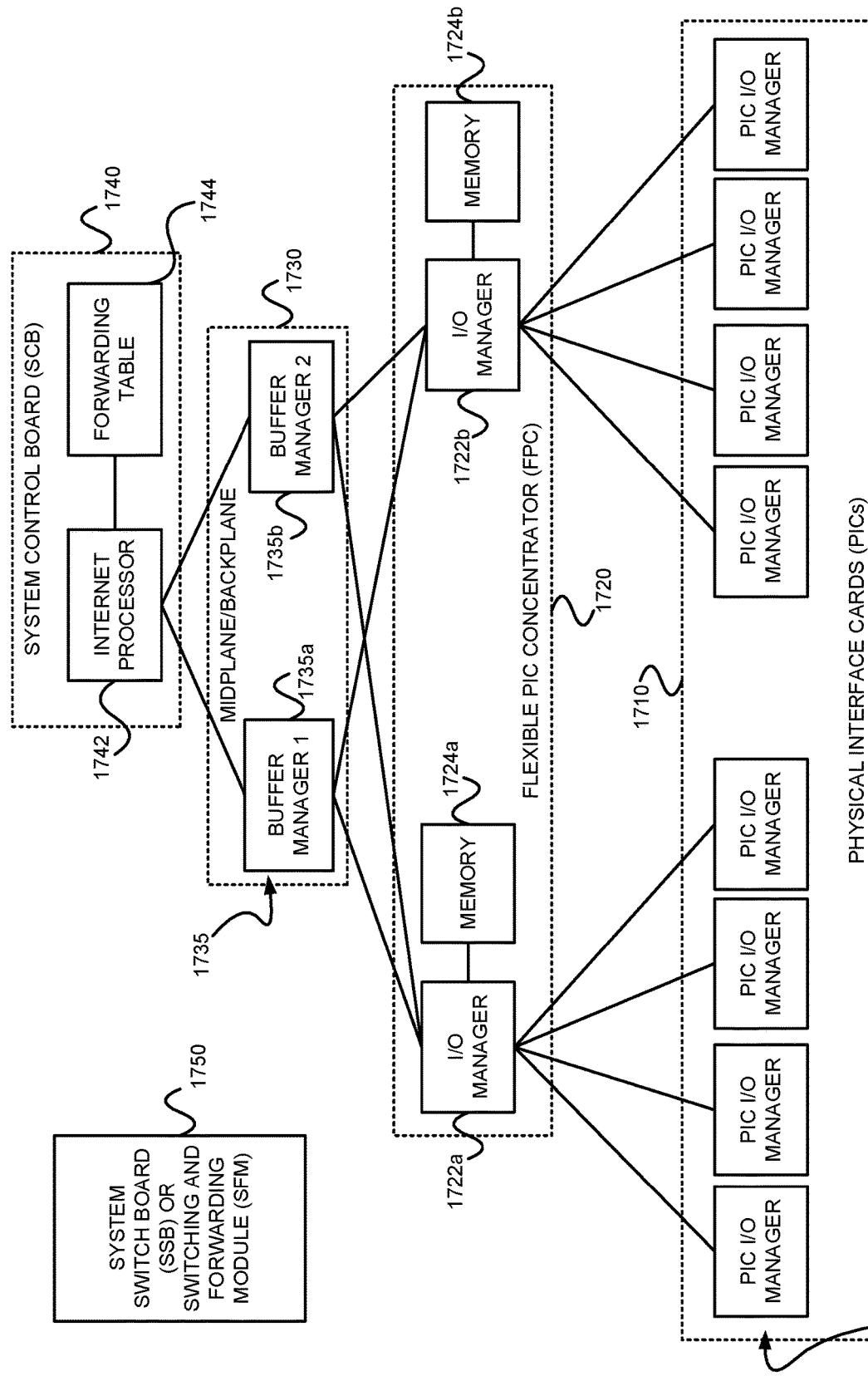
FIG. 17 is a block diagram of example distributed application specific integrated circuits ("ASICs") that may be provided in the example router of FIG. 16.

Referring back to distributed ASICs 1694 of FIG. 16, FIG. 17 is an example of how the ASICS may be distributed in the packet forwarding component 1690 to divide the responsibility of packet forwarding. As shown in FIG. 17, the ASICs of the packet forwarding component 1690 may be distributed on physical interface cards ("PICs") 1710, flexible PIC concentrators ("FPCs") 1720, a midplane or backplane 1730, and a system control board(s) 1740 (for switching and/or forwarding). Switching fabric is also shown as a system switch board ("SSB"), or a switching and forwarding module ("SFM") 1750. Each of the PICs 1710 includes one or more PIC I/O managers 1715. Each of the FPCs 1720 includes one or more I/O managers 1722, each with an associated memory 1724. The midplane/backplane 1730 includes buffer managers 1735*a*, 1735*b*. Finally, the system control board 1740 includes an Internet processor 1742 and an instance of the forwarding table 1744 (Recall, e.g., 1696 of FIG. 16).

Still referring to FIG. 17, the PICs 1710 contain the interface ports. Each PIC 1710 may be plugged into an FPC 1720. Each individual PIC 1710 may contain an ASIC that handles media-specific functions, such as framing or encapsulation. Some example PICs 1710 provide SDH/SONET, ATM, Gigabit Ethernet, Fast Ethernet, and/or DS3/E3 interface ports.

An FPC 1720 can contain from one or more PICs 1710, and may carry the signals from the PICs 1710 to the midplane/backplane 1730 as shown in FIG. 17.

The midplane/backplane 1730 holds the line cards. The line cards may connect into the midplane/backplane 1730 when inserted into the example router's chassis from the front. The control component (e.g., routing engine) 1610 may plug into the rear of the midplane/backplane 1730 from the rear of the chassis. The midplane/backplane 1730 may carry electrical (or optical) signals and power to each line card and to the control component 1610.

The system control board 1740 may perform forwarding lookup. It 1740 may also communicate errors to the routing engine. Further, it 1740 may also monitor the condition of the router based on information it receives from sensors. If an abnormal condition is detected, the system control board 1740 may immediately notify the control component 1610.

Figure 18A:
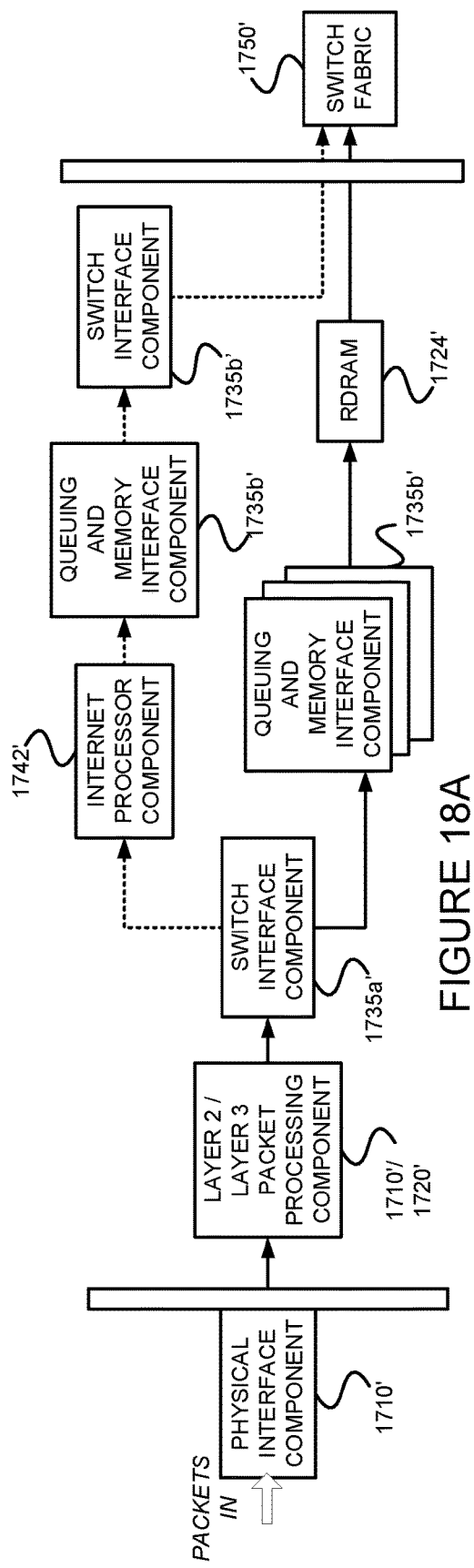
FIGS. 18A and 18B illustrate example packet forwarding operations of the example distributed ASICs of FIG. 17.
Figure 18B:
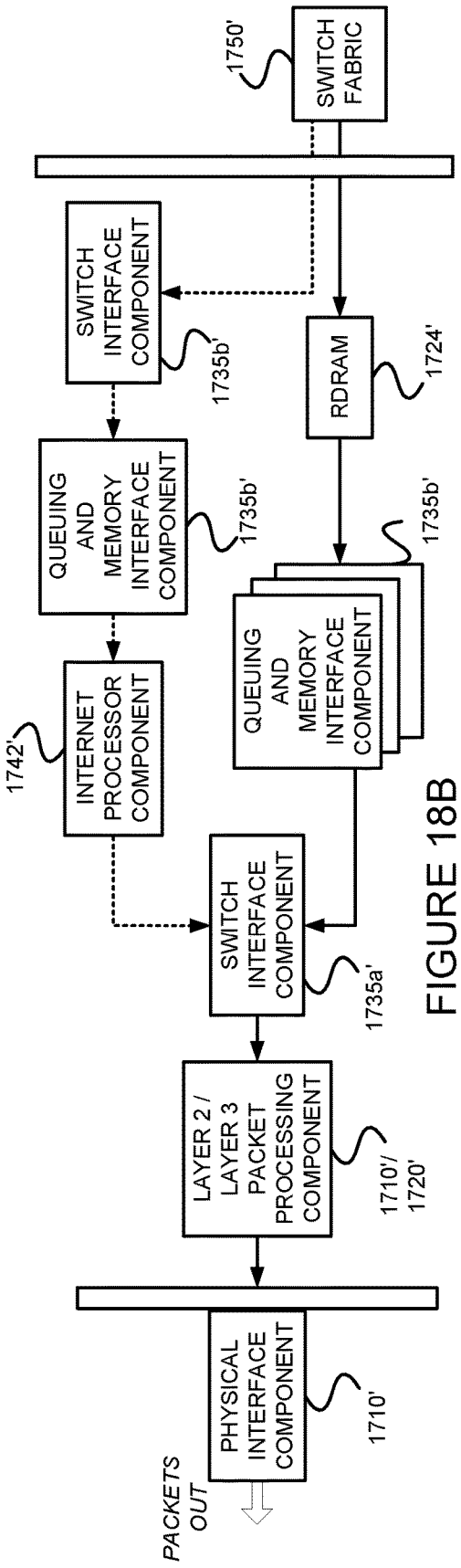

Referring to FIGS. 17, 18A and 18B, in some exemplary routers, each of the PICs 1710,1610' contains at least one I/O manager ASIC 1715 responsible for media-specific tasks, such as encapsulation. The packets pass through these I/O ASICs on their way into and out of the router. The I/O manager ASIC 1715 on the PIC 1710,1610' is responsible for managing the connection to the I/O manager ASIC 1722 on the FPC 1720,1620', managing link-layer framing and creating the bit stream, performing cyclical redundancy checks (CRCs), and detecting link-layer errors and generating alarms, when appropriate. The FPC 1720 includes another I/O manager ASIC 1722. This ASIC 1722 takes the packets from the PICs 1710 and breaks them into (e.g., 64-byte) memory blocks. This FPC I/O manager ASIC 1722 sends the blocks to a first distributed buffer manager (DBM) 1735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1735a' manages and writes packets to the shared memory 1724 across all FPCs 1720. In parallel, the first DBM ASIC 1735a' also extracts information on the destination of the packet and passes this forwarding-related information to the Internet processor 1742/1642'. The Internet processor 1742/1642' performs the route lookup using the forwarding table 1744 and sends the information over to a second DBM ASIC 1735b'. The Internet processor ASIC 1742/1642' also collects exception packets (i.e., those without a forwarding table entry) and sends them to the control component 1610. The second DBM ASIC 1735b' then takes this information and the 64-byte blocks and forwards them to the I/O manager ASIC 1722 of the egress FPC 1720/1620' (or multiple egress FPCs, in the case of multicast) for reassembly. (Thus, the DBM ASICs 1735a' and 1735b' are responsible for managing the packet memory 1724 distributed across all FPCs 1720/1620', extracting forwarding-related information from packets, and instructing the FPC where to forward packets.)

The I/O manager ASIC 1722 on the egress FPC 1720/1620' may perform some value-added services. In addition to incrementing time to live ("TTL") values and re-encapsulating the packet for handling by the PIC 1710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1722 on the egress FPC 1720/1620' may be responsible for receiving the blocks from the second DBM ASIC 1735b', incrementing TTL values, queuing a pointer to the packet, if necessary, before applying CoS rules, re-encapsulating the blocks, and sending the encapsulated packets to the PIC I/O manager ASIC 1715.

Figure 19:
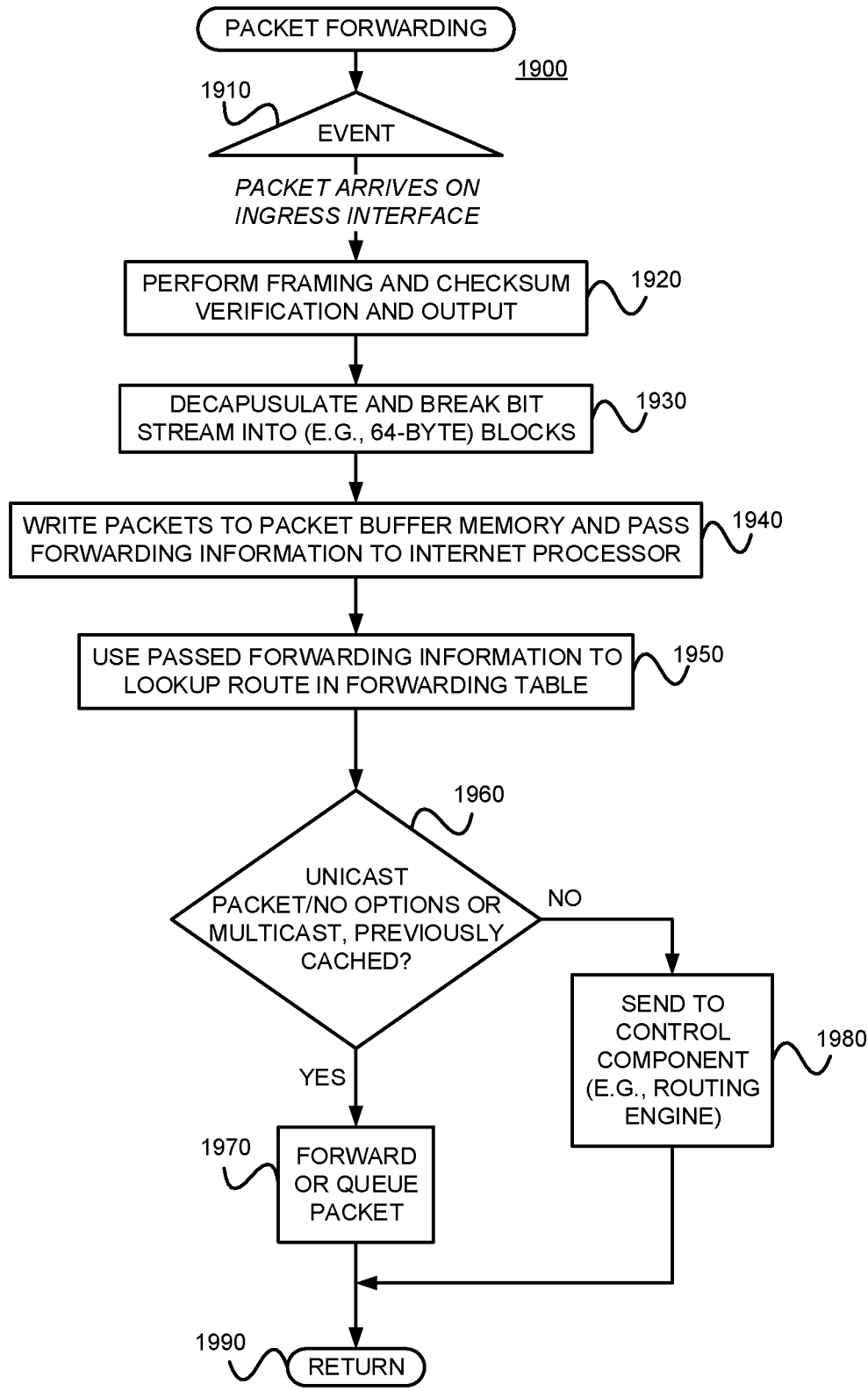
FIG. 19 is a flow diagram of an example packet forwarding method that may be implemented on any of the example routers of FIGS. 15 and 16.

FIG. 19 is a flow diagram of an example method 1900 for providing packet forwarding in the example router. The main acts of the method 1900 are triggered when a packet is received on an ingress (incoming) port or interface. (Event 1910) The types of checksum and frame checks that are required by the type of medium it serves are performed and the packet is output, as a serial bit stream. (Block 1920) The packet is then decapsulated and parsed into (e.g., 64-byte) blocks. (Block 1930) The packets are written to buffer memory and the forwarding information is passed on the Internet processor. (Block 1940) The passed forwarding information is then used to lookup a route in the forwarding table. (Block 1950) (Recall, e.g., FIGS. 17A-17D.) Note that the forwarding table can typically handle unicast packets that do not have options (e.g., accounting) set, and multicast packets for which it already has a cached entry. Thus, if it is determined that these conditions are met (YES branch of Decision 1960), the packet forwarding component finds the next hop and egress interface, and the packet is forwarded (or queued for forwarding) to the next hop via the egress interface (Block 1970) before the method 1900 is left (Node 1990) Otherwise, if these conditions are not met (NO branch of Decision 1960), the forwarding information is sent to the control component 1610 for advanced forwarding resolution (Block 1980) before the method 1900 is left (Node 1990).

Referring back to block 1970, the packet may be queued. Actually, as stated earlier with reference to FIG. 17, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1722 may send a request for the packet to the second DBM ASIC 1735b. The DBM ASIC 1735 reads the blocks from shared memory and sends them to the I/O manager ASIC 1722 on the FPC 1720, which then serializes the bits and sends them to the media-specific ASIC of the egress interface. The I/O manager ASIC 1715 on the egress PIC 1710 may apply the physical-layer framing, perform the CRC, and send the bit stream out over the link.

Referring back to block 1980 of FIG. 19, as well as FIG. 17, regarding the transfer of control and exception packets, the system control board 1740 handles nearly all exception packets. For example, the system control board 1740 may pass exception packets to the control component 1610.

Although example embodiments consistent with the present disclosure may be implemented on the example routers of FIG. 15 or 16, embodiments consistent with the present disclosure may be implemented on communications network nodes (e.g., routers, switches, etc.) having different architectures. For example, methods consistent with the present description may be run on any modern server, or even a virtual machine (e.g., without any ASICs or packet forwarding engines). More generally, embodiments consistent with the present disclosure may be implemented on an example system 2000 as illustrated on FIG. 20.

Figure 20:
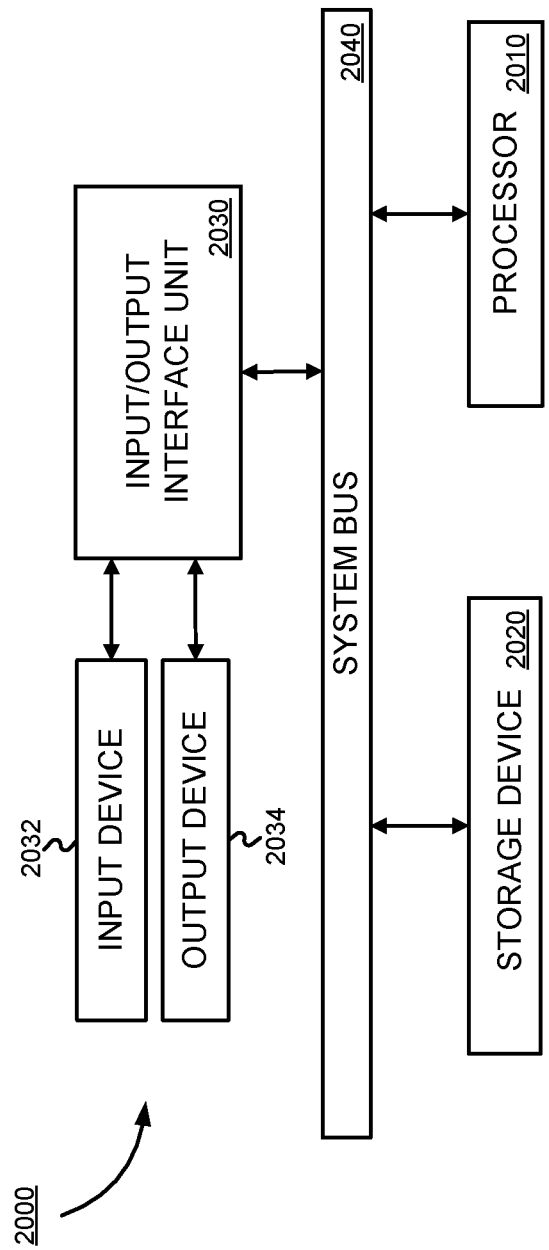
FIG. 20 is a block diagram of an example processor-based system that may be used to execute the example method(s) consistent with the present description.

FIG. 20 is a block diagram of an exemplary machine 2000 that may perform one or more of the method(s) described, and/or store information used and/or generated by such methods. The exemplary machine 2000 includes one or more processors 2010, one or more input/output interface units 2030, one or more storage devices 2020, and one or more system buses and/or networks 2040 for facilitating the communication of information among the coupled elements. One or more input devices 2032 and one or more output devices 2034 may be coupled with the one or more input/output interfaces 2030. The one or more processors 2010 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 2020 and/or may be received from an external source via one or more input interface units 2030. The machine executable instructions may be stored as various software modules, each module performing one or more operations. Functional software modules are examples of components, which may be used in the apparatus described.

In some embodiments consistent with the present disclosure, the processors 2010 may be one or more microprocessors and/or ASICs. The bus 2040 may include a system bus. The storage devices 2020 may include system memory, such as read only memory (ROM) and/or random access memory (RAM). The storage devices 2020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a software defined network (SDN) server, a laptop computer, desktop computer, a tablet computer, a mobile phone, or any device that has computing and networking capabilities.

§ 4.5 Refinements, Alternatives and Extensions

Example embodiments consistent with the present description use the Segment Routing (SR) control plane to setup LSP(s) for resilient MPLS ring networks. Details of how CW and AC ring LSP(s) are signaled using SR IGP protocol extensions are described. Further, the combination of such ring LSP(s) to achieve ring protection is also described.

Example embodiments consistent with the present description provide extensions to Segment Routing (SR) IGP signaling protocol(s) that are needed to establish Label Switched Paths (LSPs) for Resilient MPLS Rings (RMR). An RMR LSP is a multipoint to point (MP2P) LSP that is signaled using SR control plane extensions to IGPs (e.g., IS-IS, OSPF, etc.).

As noted in § 1.2.3 above, SR as defined in RFC 8402 and permits a flexible definition of end-to-end paths within IGP topologies by encoding the SR path as a sequence of one or more topological sub-paths, or "segments". Such segments can be advertised by link-state routing protocols such as IS-IS or OSPF.

As noted in § 1.2.2 above, rings are auto-discovered using the mechanisms described in the document, Kompella, et al, "Resilient MPLS Rings", draft-ietf-mpls-rmr-11 (Internet Engineering Task Force, June 2019)(incorporated herein by reference). Signaling extensions for IS-IS and OSPF are introduced in the document, Kompella, "IGP Extensions for Resilient MPLS Rings", draft-kompella-isis-ospf-rmr-00 (Internet Engineering Task Force, October 2016)(incorporated herein by reference), to enable the auto-discovery of ring topologies. After the ring topology is discovered, each node in the ring determines its CW and AC ring neighbors and associated ring links.

The document, Deshmukh, et al, "RSVP Extensions for RMR", draft-ietf-teas-rsvp-rmr-extension-01 (Internet Engineering Task Force, June 2018)(incorporated herein by reference), describes RSVP-TE (See, e.g., the document, Awduche, et al, "RSVP-TE: Extensions to RSVP for LSP Tunnels", Request for Comments 3209 (Internet Engineering Task Force, December 2001)(incorporated herein by reference).) signaling protocol extensions that may be used to setup Resilient MPLS Ring (RMR) LSPs. The document, Esale, et al, "LDP Extensions for RMR", draft-ietf-mpls-ldp-rmr-extensions-02 (Internet Engineering Task Force, June 2019)(incorporated herein by reference) describes extensions to LDP (See, e.g., Andersson, L., Ed., Minei, I., Ed., and B. Thomas, Ed., "LDP Specification", Request for Comments 5036 (Internet Engineering Task Force, October 2007)(incorporated herein by reference).) signaling protocol that may be used for LDP setup RMR LSPs.

The present application describes how Segment Routing (SR) IGP control plane can be extended to allow for the setup of RMR LSPs and how a pair of CW and AC SR MPLS LSPs can provide the required protection for ring topologies.

§ 4.5.1 Protocol Extensions

This section describes example IGP protocol extensions to SR to allow signaling and establishing RMR LSP(s) to each node in a ring.

§ 4.5.1.1 SR Ring Capability

A new sub-TLV may be defined for SR RMR Ring capability to advertise node support for signaling SR RMR LSP(s) using extensions in IS-IS and OSPF protocol(s). If the SR RMR Ring Capability is not advertised by a node, such node is assumed to be not capable of establishing SR RMR LSP(s) using SR control plane extensions. The SR RMR Ring Capability sub-TLV may have a 1-octet type field, a 1-octet length field, and a 1-octet flags field. The length field carries the length, in octets. The type and flags fields are open to design.

§ 4.5.1.1.1 IS-IS SR RMR Ring Capabilities SUB-TLV

In IS-IS, the Router Capability TLV TLV-242 defined in the document, Ginsberg, et al., "IS-IS Extensions for Advertising Router Information", Request for Comments 7981 (Internet Engineering Task Force, October 2016)(incorporated herein by reference), may be used to carry the SR RMR Ring Capability sub-TLV.

§ 4.5.1.1.2 OSPF SR RMR Ring Capabilities SUB-TLV

In OSPF, a top-level TLV of the Router Information Opaque LSA (defined in the document, Lindem, A., Ed., "Extensions to OSPF for Advertising Optional Router Capabilities", Request for Comments 7770 (Internet Engineering Task Force, February 2016)(incorporated herein by reference)) may be used to carry the SR RMR Ring Capability sub-TLV.

§ 4.5.1.2 SR Ring Prefix Segment Identifier (Ring-SID)

In order to setup an SR RMR LSP(s) in CW and AC directions towards each node of the ring, a new Ring SR Prefix Segment Identifier (Ring-SID) sub-TLV, as defined herein, may be used. The Ring-SID sub-TLV carries the IGP Segment Routing Ring-SID that is associated with the advertised prefix by the node. The Ring-SID is unique within a specific ring in an IGP domain.

For IS-IS protocol, the Ring-SID MAY be present in any of the following TLVs:
- TLV-135 (Extended IPv4 reachability) defined in the document, Li, et al, "IS-IS Extensions for Traffic Engineering", Request for Comments 5305 (Internet Engineering Task Force, October 2008)(incorporated herein by reference).
- TLV-235 (Multitopology IPv4 Reachability) defined in the document, Przygienda, et al, "M-ISIS: MultiTopology (MT) Routing in Intermediate System to Intermediate Systems (IS-ISs)", Request for Comments 5120 (Internet Engineering Task Force, February 2008)(referred to as "RFC 5120" and incorporated herein by reference).
- TLV-236 (IPv6 IP Reachability) defined in the document, Hopps, "Routing IPv6 with IS-IS", Request for Comments 5308 (Internet Engineering Task Force, October 2008)(incorporated herein by reference).
- TLV-237 (Multitopology IPv6 IP Reachability) defined in RFC 5120.

For OSPF protocol, the Ring-SID sub-TLV is carried as part of the OSPF Extended Prefix TLV defined in the document, Psenak, et al, "OSPFv2 Prefix/Link Attribute Advertisement", Request for Comments 7684 (Internet Engineering Task Force, November 2015)(incorporated herein by reference).

The Ring-SID sub-TLV may have the format described above with reference to FIG. 14. Other formats are possible.

§ 4.5.1.3 Ring Segment Identifier (Ring-SID)

An alternative means of propagating the CW and AC-Ring-SIDs is as a sub-TLV of the RMR TLV. This sub-TLV may have the format shown in FIG. 14B in IS-IS. More specifically, as shown, this sub-TLV may have a 1-octet type field, a 1-octet length field, a 32-bit CW-Ring-SID field 1470a and 1470b, and a 32-bit AC-Ring-SID field 1480a and 1480b. The type field 1410 carries a value indicating the type of the sub-TLV. The length field 1420 is set to 8-octets (32 bits for the CW-Ring-SID+32 bits for the AC-Ring-SID). Finally, the CW-Ring-SID followed by the AC-Ring-SID comprise the "value" of the sub-TLV.

§ 4.5.1.4 Ring-SID Propogation

The Ring-SID may be propagated using the rules provided in the document, Previdi, et al, "IS-IS Extensions for Segment Routing", draft-ietf-isis-segment-routing-extensions-25 (Internet Engineering Task Force, May 2019)(incorporated herein by reference) and Psenak, et al, "OSPF Extensions for Segment Routing", draft-ietf-ospf-segment-routing-extensions-27 (Internet Engineering Task Force, December 2018)(incorporated herein by reference).

§ 4.5.2 Ring SR Signaling Procedures

§ 4.5.2.1 Ring SID Assignment

As described in the document, Kompella, et al, "Resilient MPLS Rings", draft-ietf-mpls-rmr-11 (Internet Engineering Task Force, June 2019)(incorporated herein by reference), a ring of RID r can either be (A) configured on all nodes participating in ring r, or (B) configured on select master member ring node(s) while running other nodes in promiscuous mode. All ring node(s) participating in a ring may use the IGP extensions defined in the document, Kompella, "IGP Extensions for Resilient MPLS Rings", draft-kompella-isis-ospf-rmr-00 (Internet Engineering Task Force, October 2016)(incorporated herein by reference), to advertise their ring membership and to complete ring discovery and identification phase.

Unique CW and/or AC Ring-SID(s) are assigned to a prefix on residing on each ring member node participating in the ring.

§ 4.5.2.1.1 Static Ring-SID Assignment

An operator can choose to statically assign and configure the unique CW and AC Ring-SID(s) associated with the prefixes residing on each member node of the ring. In such case, it is expected that Ring-SID assignment and management becomes the responsibility of the network operator in order to ensure global uniqueness.

When static provisioning of Ring-SID(s) on ring node(s) is implemented, the Ring-SID(s) sub-TLV(s) may be explicitly advertised along with the prefix reachability advertisement. Examples of such explicit advertisement(s) for prefix-SID(s) are given in the documents, Previdi, et al, "IS-IS Extensions for Segment Routing", draft-ietf-isis-segment-routing-extensions-25 (Internet Engineering Task Force, May 2019)(incorporated herein by reference), Psenak, et al, "OSPF Extensions for Segment Routing", draft-ietf-ospf-segment-routing-extensions-27 (Internet Engineering Task Force, December 2018)(incorporated herein by reference), and Psenak, et al, "OSPFv3 Extensions for Segment Routing", draft-ietf-ospf-ospfv3-segment-routing-extensions-23 (Internet Engineering Task Force, January 2019)(incorporated herein by reference).

§ 4.5.2.1.2 Ring-SID Assignment Using SRMS

It is possible to leverage the Segment Routing Mapping Server (SRMS) functionality as defined in the document, Bashandy, et al, "Segment Routing interworking with LDP", draft-ietf-spring-segment-routing-ldp-interop-15 (Internet Engineering Task Force, September 2018)(incorporated herein by reference), to assign, advertise, and manage Ring-SID(s) on behalf of all ring nodes in the network. This simplifies the burden on the operator to provision rings and Ring-SID(s) on network ring nodes, by restricting configuration to only select nodes in the ring (e.g. master node(s)).

The SRMS functionality may include two functional blocks: (1) a Mapping Server (MS) and (2) a Mapping Client (MC). The SR MS functionality supports the advertisement of prefix-SID(s) to a prefix without the need to explicitly advertise such assignment within a prefix reachability advertisement. The MS functionality may be extended to allow it to advertise the Ring-SID to prefix mapping in a similar fashion.

The SR MC is any node that receives and uses the MS mapping advertisements. The MC interprets the SR mapping Ring-SID advertisement as an assignment of a Ring-SID to a prefix. Note that the SRMS node can serve as both an MS and an MC.

To implement the SRMS for assigning and managing Ring-SID(s), the network operator should reserve a block of SR Ring SID indices and delegate it to the SRMS.

When a ring of RID r is configured/enabled on a ring master node, the SRMS may learn of ring nodes participating in ring RID r using the ring node TLV defined in the document, Kompella, "IGP Extensions for Resilient MPLS Rings", draft-kompella-isis-ospf-rmr-00 (Internet Engineering Task Force, October 2016)(incorporated herein by reference). Whenever the SRMS discovers a new ring node, it may automatically assign two unique Ring-SID(s)—one for a CW Ring-SID LSP and another for an AC Ring-SID LSP—from the available SID(s) within the Ring SID block available on the SRMS.

After CW and AC Ring-SID(s) are assigned to a ring node prefix, the SRMS may then advertise the Ring-SID sub-TLV in a SID/label binding TLV as described in the documents, Previdi, et al, "IS-IS Extensions for Segment Routing", draft-ietf-isis-segment-routing-extensions-25 (Internet Engineering Task Force, May 2019)(incorporated herein by reference) and Psenak, et al, "OSPF Extensions for Segment Routing", draft-ietf-ospf-segment-routing-extensions-27 (Internet Engineering Task Force, December 2018)(incorporated herein by reference).

§ 4.5.2.1.3 Ring-SID Assignment Using the Dynamic Host Cocnfiguration Protocol (DHCP)

The Dynamic Host Configuration Protocol (DHCP) is well-suited for handling node and ring SID assignments. When ring directions have been established for all links in the ring, each node can request, as a DHCP client, a pair of ring SIDs. The DHCP server may respond with two unique values from the SID block(s) for Ring SIDs with which it has been configured. The DHCP server should be configured with very long leases for such assignments, as well as "sticky" assignments. That is, should a lease expire, the pair of values assigned should not be offered to another client unless the server has run out of ring SID values. Also, should the same client re-request ring SIDs, the server should return the same SIDs if possible. Further details are provided in the document, Kompella, et al, "Using DHCP to Manage Node and Ring SID Assignment", draft-kompella-spring-dhcp-00 (Internet Engineering Task Force, July 2019)(incorporated herein by reference).

§ 4.5.2.2. Ring SID LSP Setup

Any ring node that receives a Ring-SID advertisement, as either part of an explicit prefix TLV advertisement or part of a SID/label binding TLV advertised by the SRMS, will perform the following depending on ring node role (i.e., ingress, egress, or transit).

§ 4.5.2.2.1. Egress Ring Node

An node that is member of a ring RID r can advertise a Ring-SID sub-TLV associated with local prefix. If the node learns of a Ring-SID sub-TLV associated to local prefix using the SID/label binding TLV advertised by the SRMS, the node first verifies that it is member of ring indicated in the Ring-SID sub-TLV. If it is not a member of the ring (or cannot verify that it is a member), the node does not process the Ring-SID sub-TLV any further. Otherwise, if the node verifies that it is a member of the ring indicated in the Ring-SID sub-TLV, it ensures that the corresponding local MPLS label from its SRGB is assigned and bound to the specific local prefix and RID. If no pen-ultimate hop popping is desired, an egress Incoming Label Map (ILM) entry corresponding for the corresponding local label is installed in the forwarding table as usual.

§ 4.5.2.2.2. Ingress and Transit Ring Nodes

An ingress or transit node that receives a Ring-SID sub-TLV advertisement for a remote prefix through an explicit prefix TLV advertisement, or through a SID/label binding TLV for a remote prefix will first verify that it is member of the ring indicated in the Ring-SID sub-TLV advertisement before processing it any further. If the ingress or transit node is not a member of the Ring-SID's ring, or if it cannot verify that it is a member, the node does not process the Ring-SID any further. Otherwise, if the ingress or transit node verifies that it is member of the ring indicated in the Ring-SID, the ingress or transit node assigns the corresponding local MPLS label in its SRGB and binds it to the specific remote prefix and for the specific ring.

As described above, the Ring-SID sub-TLV may carry an Algorithm identifier that indicates the procedure to derive the set of next-hop(s) to reach a CW or AC neighbor. (Recall, e.g., 1440 of FIG. 14.) The default algorithm (Algorithm 0) is to include all next-hop(s)/links between itself and the respective downstream neighbor. The D-Flag in the Flags field (Recall, e.g., 1430 of FIG. 14.) within the Ring-SID sub-TLV indicates whether the CW or AC downstream neighbors are intended.

An operator may use other user-defined Algorithms to allow a ingress or transit ring node to select (e.g., specific) link(s)/neighbors that connect to the downstream CW or AC neighbor.

Once the CW and AC next-hop(s) are determined, the ingress or transit router(s) of the RMR ring LSP may add the corresponding ILM entries for the CW and AC labels and map each to the set of CW and AC Next-hop Label Forwarding Entries (NHLFE)s.

§ 4.5.2.2.3 Protection and Fastreroute

In addition to assigning and programming the primary CW or AC next-hop(s) as described in the previous section, the ingress or a transit node that receives a Ring-SID advertisement from a remote ring node may also assign the opposite direction AC or CW next-hop and its associated AC or CW Ring-SID as a backup path. Upon failure, the ingress or a transit router that detects a local link failure of the Ring-SID's primary next-hop, may immediately divert traffic on to the pre-programmed backup next-hop of the Ring-SID. Thus, traffic originally flowing in a CW or AC direction will be diverted to flow on to flow in the AC or CW direction, respectively, after the detected failure. Upon failure at a transit ring node along the path of a Ring-SID, any upstream router that learns of the downstream link failure (e.g., via IGP link updates) can locally reroute the traffic towards the backup next-hop. Doing so optimizes the repair path and avoids packets from being unnecessarily forwarded all the way to the ring node where local fault occurred, only to be looped back on the opposite Ring-SID due to the fault.

§ 4.6 Example of Operation(s) in an Example Embodiment

§ 4.6.1 Example of RMR SR LSP Pair Setup Using Ring SID(s)

Figure 21:
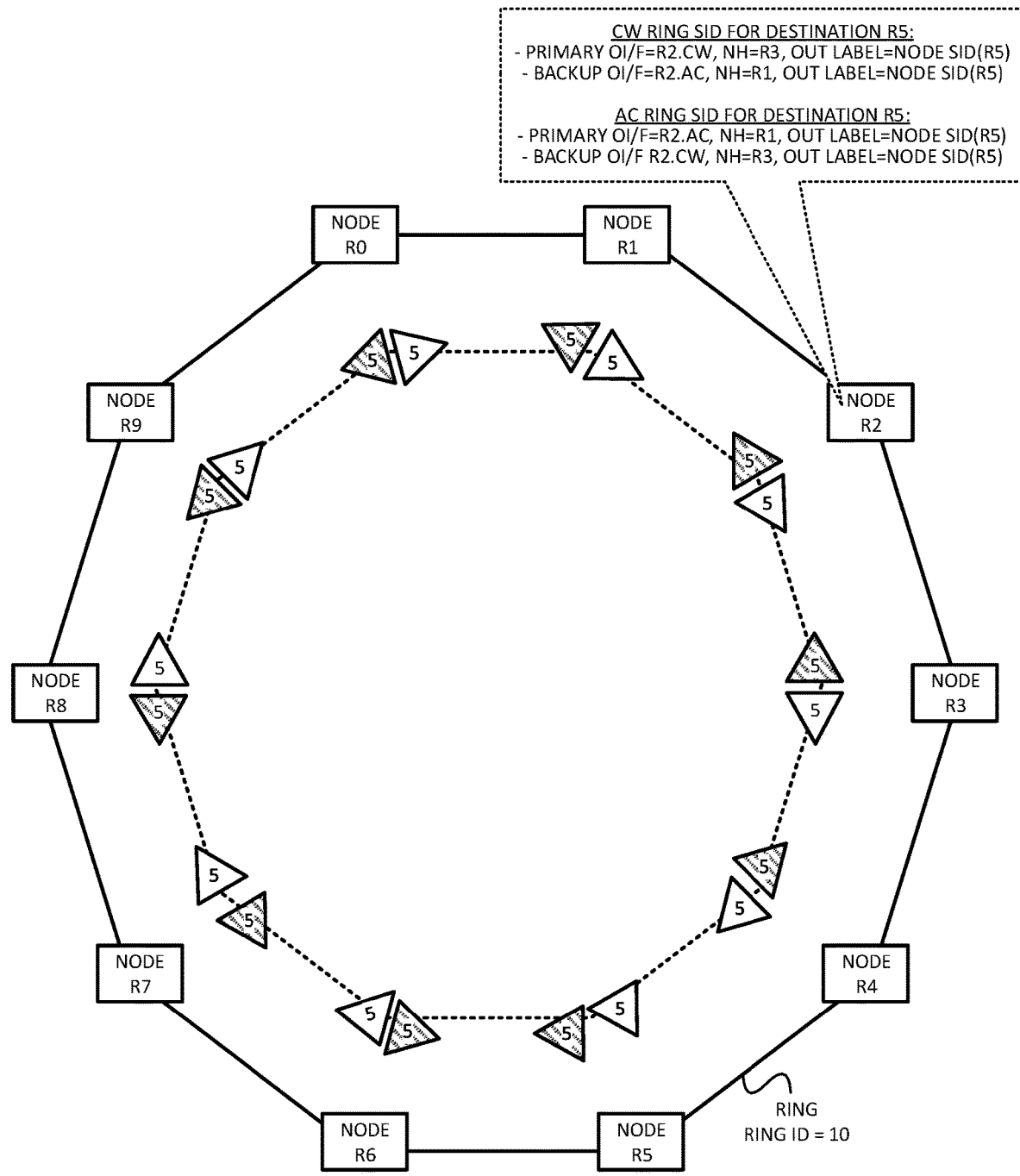
FIG. 21 is an example illustrating how ring SID(s) may be used to setup RIVIR SR LSP pairs in a manner consistent with the present description.

FIG. 21 illustrates how ring SID(s) are used to setup RIVIR SR LSP pairs. In FIG. 21, triangles with hatching indicate an AC-Ring-SID (for node R5) for Ring-ID=10, and triangles without fill indicate its paired CW Ring-SID (node R5) for Ring-ID=10. Note that there are two SR Ring-SID labels (or SR indices)—CW-Ring-SID and AC-Ring-SID— assigned to each node belonging to the ring.

Each node of the ring may program its LFIB to include the following:
the CW-Ring-SID and AC-Ring-SID primary path information, which are derived from the CW and AC neighbors, respectively, of the node; and
the CW-Ring-SID and AC-Ring-SID backup path information, which are derived from the AC and CW neighbors, respectively, of the node.

For example, consider node R2. For the Node SID (node R5), its LFIB would include:
for the CW-Ring-SID for destination node R5,
primary outgoing interface=R2.CW, Next Hop=R3, Outgoing Label=Node SID(R5)
backup outgoing interface=R2.AC, Next Hop=R1, Outgoing Label=Node SID(R5)
for the AC-Ring-SID for destination node R5,
primary outgoing interface=R2. AC, Next Hop=R1, Outgoing Label=Node SID(R5)
backup outgoing interface-R2. CW, Next Hop=R3, Outgoing Label=Node SID (R5).

Note that the number of entries in the LFIB for the ring is twice the number of nodes belonging to the ring. This helps scalability.

As noted earlier, unique Ring-SID(s) are assigned per ring node. These may be configured (or static), or provisioned on demand (or dynamic). If the Ring-SIDS are to be configured statically, it is the operator's responsibility (1) to ensure global uniqueness (within the IGP domain) of the Ring-SIDS, and (2) to configure and manage SRGB label(s) for the Ring SID(s). If the Ring-SIDS are to be assigned dynamically, on demand, this may be done by a SRMS, which may be used to manage assignment of per Ring SRGB and Ring SID(s).

§ 4.6.2 Example of SRMS Managed Ring SID(s)

Figure 22:
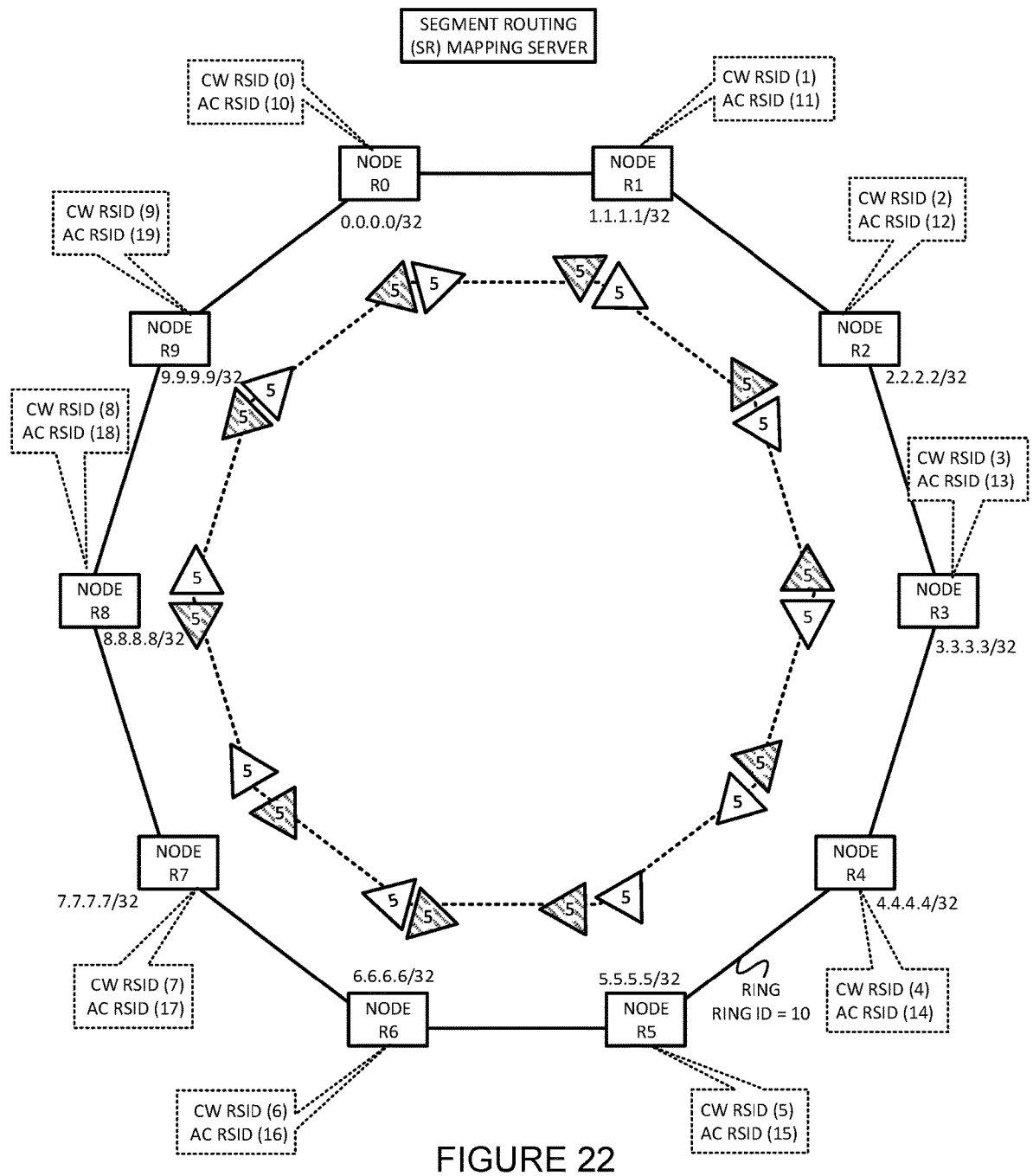
FIG. 22 is an example illustrating how ring SID(s) may be managed using an SRMS in a manner consistent with the present description.

FIG. 22 illustrates how ring SID(s) can be managed using an SRMS. In this example, assume that each of the nodes R0-R9 is a client of the SRMS. Further assume that node R0 has IP address 0.0.0.0/32, node R1 has IP address 1.1.1.1/32, node R2 has IP address 2.2.2.2/32, . . . , and node R9 has IP address 9.9.9.9/32. In this example, the operator reserves a label block (from all nodes) to be managed by the SRMS for Ring SIDS. As is known, the label block includes a start label and an end label, or a start label and label range. Note that all of the nodes can use the same label block, though this is not necessary. Assume that an operator configures Ring ID=10 on R0 and makes R0 the Ring Master.

R0 advertises its membership in Ring ID=10 with Ring Node TLV in IGP. The SRMS (1) learns of R0's membership to Ring ID=10, (2) assigns a unique CW-Ring-SID and AC-Ring-SID to R0, and (3) advertises the CW-Ring-SID and AC-Ring-SID on behalf of R0 to the other nodes of the ring. So, this advertisement might include, among other things:
Ring ID=10, 0.0.0.0/32, SID Index=0, algorithm=CW; and
Ring ID=10, 0.0.0.0/32, SID Index=10, algorithm=AC.

Nodes R1-R9 learn of the Ring ID=10 (via auto discovery) and join the Ring ID=10 also (in promiscuous mode). These nodes (R1-R9) may also advertise their membership in Ring ID=10 with the Ring Node TLV. The SRMS (1) learns of the membership of R1-9 to Ring ID=10, (2) assigns a unique CW-Ring-SID and AC-Ring-SID to each of the nodes R1-9, and (3) advertises the CW-Ring-SID and AC-Ring-SID on behalf of each of the nodes R1-9, to the other nodes of the ring. In this example, assume that the SRMS assigns CW-Ring-SIDS 0, 1, . . . , 9 to nodes R0-R9, respectively, and assigns AC-Ring-SIDS 10, 11, . . . , 19 to nodes R0-R9, respectively. So, these advertisements might include, among other things:

Ring $ID$ = 10, 1.1.1.1/32, $SID$ Index = 1, algorithm = $CW$

Ring $ID$ = 10, 1.1.1.1/32, $SID$ Index = 11, algorithm = $AC$; and

Ring $ID$ = 10, 2.2.2.2/32, $SID$ Index = 2, algorithm = $CW$

Ring $ID$ = 10, 2.2.2.2/32, $SID$ Index = 12, algorithm = $AC$; and $\vdots$

Ring $ID$ = 10, 9.9.9.9/32, $SID$ Index = 9, algorithm = $CW$

Ring $ID$ = 10, 9.9.9.9/32, $SID$ Index = 19, algorithm = $AC$.

To reiterate, node R0 determines its CW and AC neighbors for Ring ID=10. The other nodes (R1-R9) do the same. For each of the nodes, when the node receives the remote Ring SID advertisement from the SRMS, it (1) uses the Ring ID to determine the CW Next Hop and the AC Next Hop, and (2) uses the IGP LSDB to determine per Next Hop outgoing labels. Each of the nodes R0-R9 then program its LFIB with the primary path and backup path information, for both the CW and AC paths.

§ 4.7 Conclusions

As should be apparent, example embodiments consistent with the present description allow a ring node N belonging to a resilient MPLS ring (RMR) to provision and/or configure clockwise (CW) and anti-clockwise (AC) paths on the RMR.

What is claimed is:
1. A computer-implemented method for used by a ring node N belonging to a ring, the computer-implemented method comprising:
a) configuring two ring node segment identifiers (Ring-SIDs) on the ring node N, wherein a first of the two Ring-SIDs (CW-Ring-SID) is to reach N in a clockwise direction on the ring and a second of the two Ring-SIDs (AC-Ring-SID) is to reach N in an anti-clockwise direction on the ring, and wherein the CW-Ring-SID and AC-Ring-SID are unique within a source packet routing in networking (SPRING) domain including the ring;
b) generating a control advertisement message including the ring node's CW-Ring-SID and AC-Ring-SID; and c) advertising the control advertisement message, via an interior gateway protocol, for receipt by other ring nodes belonging to the ring such that (1) a clockwise multipoint-to-point path (CWP) is defined such that every other one of the ring nodes belonging to the ring can be an ingress for the CWP and such that only the ring node N is an egress for the CWP, and (2) an anti-clockwise multipoint-to-point path (ACP) is defined such that every other one of the ring nodes belonging to the ring can be an ingress for the ACP and such that only the ring node N is an egress for the ACP.

2. The computer-implemented method of claim 1, further comprising:
d) receiving, by the ring node N, another control advertisement message including another one of the ring node's CW-Ring-SID and AC-Ring-SID;
e) generating and storing, a first label forwarding information base (LFIB) entry including
  1) a node segment identifier (Node-SID) associated with the other one of the ring nodes, or a multiprotocol label switching (MPLS) label derived from the Node-SID,
  2) a next hop set to a ring node belonging to the ring and being adjacent and clockwise to the ring node; and
f) generating and storing, a second LFIB entry including
  1) the Node-SID associated with the other one of the ring nodes, or a multiprotocol label switching (MPLS) label derived from the Node-SID, and
  2) a next hop set to a ring node belonging to the ring and being adjacent and anti-clockwise to the ring node,
  wherein one of the first and second LFIB entries is identified as a primary, and the other of the first and second LFIB entries is identified as a backup.

3. The computer-implemented method of claim 2 wherein the MPLS label is derived from the Node-SID using a minimum or maximum value from a segment routing global block (SRGB) defining a range of label values.

4. The computer-implemented method of claim 1 wherein the act of configuring the CW-Ring-SID and the AC-Ring-SID is performed by a segment routing mapping server (SRMS) using a reserved block of Ring-SID indices.

5. The computer-implemented method of claim 1 wherein the act of configuring the CW-Ring-SID and the AC-Ring-SID is performed by a Dynamic Host Configuration Protocol (DHCP) server.

6. The computer-implemented method of claim 1 wherein the act of configuring the CW-Ring-SID and the AC-Ring-SID is performed by a Path Computation Element Communication Protocol (PCEP) server.

7. The computer-implemented method of claim 1 wherein the control advertisement message including the ring node's CW-Ring-SID and AC-Ring-SID further includes information for identifying an algorithm used to derive a next hop to reach the ring node.

8. The computer-implemented method of claim 7 wherein the algorithm used to derive a next hop to reach the ring node specifies the use of a specified one of a CW next hop and an AC next hop.

9. The computer-implemented method of claim 1 wherein the control advertisement message is advertised by flooding it over an interior gateway protocol (IGP) domain.

10. The computer-implemented method of claim 1 wherein the control advertisement message is advertised within an explicit prefix type-length-value (TLV) interior gateway protocol (IGP) advertisement.

11. The computer-implemented method of claim 1 wherein the control advertisement message is advertised within a SID/label binding type-length-value (TLV) interior gateway protocol (IGP) advertisement.

12. The computer-implemented method of claim 1 wherein each of the ring node's CW-Ring-SID and AC-Ring-SID included in the control advertisement message is expressed as a label value.

13. The computer-implemented method of claim 1 wherein each of the ring node's CW-Ring-SID and AC-Ring-SID included in the control advertisement message is expressed as an index defining an offset from one of a start or end of a predefined segment routing global block (SRGB) of labels.

14. The computer-implemented method of claim 1 wherein the act of advertising the control advertisement message, via an interior gateway protocol, for receipt by other ring nodes belonging to the ring such that (1) a clockwise multipoint-to-point path (CWP) is defined such that every one of the ring nodes, including the ring node itself, belonging to the ring can be an ingress for the CWP and such that only the ring node N is an egress for the CWP, and (2) an anti-clockwise multipoint-to-point path (ACP) is defined such that every one of the ring nodes, including the ring node itself, belonging to the ring can be an ingress for the ACP and such that only the ring node N is an egress for the ACP.

15. A node assigned to a ring comprising a subset of n nodes $\{R_i, 0<=i<n\}$, wherein a direction from node $R_i$ to $R_{i+1}$ is defined as "clockwise" (CW) and the reverse direction is defined as "anti-clockwise" (AC), the node comprising:
a) a control component configured to perform a method including
  1) configuring two ring node segment identifiers (Ring-SIDs) on the ring node N, wherein a first of the two Ring-SIDs (CW-Ring-SID) is to reach N in a clockwise direction on the ring and a second of the two Ring-SIDs (AC-Ring-SID) is to reach N in an anti-clockwise direction on the ring, and wherein the CW-Ring-SID and AC-Ring-SID are unique within a source packet routing in networking (SPRING) domain including the ring,
  2) generating a control advertisement message including the ring node's CW-Ring-SID and AC-Ring-SID, and
  3) advertising the control advertisement message, via an interior gateway protocol, for receipt by other ring nodes belonging to the ring such that (1) a clockwise multipoint-to-point path (CWP) is defined such that every other one of the ring nodes belonging to the ring can be an ingress for the CWP and such that only the ring node N is an egress for the CWP, and (2) an anti-clockwise multipoint-to-point path (ACP) is defined such that every other one of the ring nodes belonging to the ring can be an ingress for the ACP and such that only the ring node N is an egress for the ACP;
b) a storage medium for storing a label forwarding information base (LFIB); and
c) a forwarding component configured to forward received labeled packets using the information in the LFIB.

16. A non-transitory computer-readable medium storing processor executable instructions which, when executed by at least one processor of a ring node N belonging to a ring, cause the at least one processor to perform a method comprising:
  a) configuring two ring node segment identifiers (Ring-SIDs) on the ring node N, wherein a first of the two Ring-SIDs (CW-Ring-SID) is to reach N in a clockwise direction on the ring and a second of the two Ring-SIDs (AC-Ring-SID) is to reach N in an anti-clockwise direction on the ring, and wherein the CW-Ring-SID and AC-Ring-SID are unique within a source packet routing in networking (SPRING) domain including the ring;
  b) generating a control advertisement message including the ring node's CW-Ring-SID and AC-Ring-SID; and
  c) advertising the control advertisement message, via an interior gateway protocol, for receipt by other ring nodes belonging to the ring such that (1) a clockwise multipoint-to-point path (CWP) is defined such that every other one of the ring nodes belonging to the ring can be an ingress for the CWP and such that only the ring node N is an egress for the CWP, and (2) an anti-clockwise multipoint-to-point path (ACP) is defined such that every other one of the ring nodes belonging to the ring can be an ingress for the ACP and such that only the ring node N is an egress for the ACP.

17. The non-transitory computer-readable medium of claim 16 wherein the act of configuring the CW-Ring-SID and the AC-Ring-SID is performed by a Dynamic Host Configuration Protocol (DHCP) server.

18. The non-transitory computer-readable medium of claim 16 wherein the control advertisement message including the ring node's CW-Ring-SID and AC-Ring-SID further includes information for identifying an algorithm used to derive a next hop to reach the ring node.

19. The non-transitory computer-readable medium of claim 18 wherein the algorithm used to derive a next hop to reach the ring node specifies the use of a specified one of a CW next hop and an AC next hop.

20. The non-transitory computer-readable medium of claim 16 wherein the control advertisement message is advertised within an explicit prefix type-length-value (TLV) interior gateway protocol (IGP) advertisement.

* * * * *